(12) United States Patent
Popovic'

(10) Patent No.: US 6,567,482 B1
(45) Date of Patent: May 20, 2003

(54) METHOD AND APPARATUS FOR EFFICIENT SYNCHRONIZATION IN SPREAD SPECTRUM COMMUNICATIONS

(75) Inventor: Branislav M. Popovic', Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/263,106

(22) Filed: Mar. 5, 1999

(51) Int. Cl.[7] .......................... H03D 1/00; H04D 27/06
(52) U.S. Cl. .................... 375/343; 375/149; 375/152
(58) Field of Search ................. 375/343, 367, 375/134, 137, 140, 142, 143, 145, 148, 149, 150, 152; 370/515, 509, 514, 350

(56) References Cited

U.S. PATENT DOCUMENTS

| | | | | |
|---|---|---|---|---|
| 4,513,288 A | * | 4/1985 | Weathers et al. | 342/201 |
| 5,311,544 A | * | 5/1994 | Park et al. | 375/206 |
| 5,537,396 A | * | 7/1996 | Kanda et al. | 370/479 |
| 5,537,419 A | * | 7/1996 | Parr et al. | 370/350 |
| 6,009,125 A | | 12/1999 | Ballarin et al. | |
| 6,181,729 B1 | * | 1/2001 | OaFarrell | 375/130 |

FOREIGN PATENT DOCUMENTS

| | | |
|---|---|---|
| EP | 0 789 467 A | 8/1997 |
| EP | 0 940 761 A | 9/1999 |
| JP | 2000 091954 A | 3/2000 |

OTHER PUBLICATIONS

*1997 IEEE 6th International Conference on Universal Personal Communications Record*, Oct. 12–16, 1997, Hotel Del Coronoado, San Diego, CA, USA, Conference Record, vol. 1 of 2, Riaz Esmailzadeh et al., "New Slotted ALOHA Based Random Access Method for CDMA Systems", pp. 43–47.

*ETSI STC SMG2 UMTS Layer 1 Expert Group*, Stockholm, Sweden, Oct. 14–16, 1998, "A new correlation sequence for the Primary Synchronization Code with good correlation properties and low detector complexity".

*UMTS XX.05 V2.0 Technical Report* (Nov. 1998), "UTRA FDD, spreading and modulation description".

*UMTS XX.07 V1.0.0 Technical Report* (Dec. 1998), "UTRA FDD; Physical layer procedures".

*Electronics Letters*, Jan. 31, 1991, vol. 27, No. 3, pp. 219–220, S.Z. Budisin, "Efficient Pulse Compressor for Golay Complementary Sequences".

*IRE Transactions on Information Theory*, Apr. 1961, pp. 82–87, Marcel J.E. Golay, "Complementary Series".

*UMTS XX.03 V1.3.1 Technical Report* (Feb. 1992), UMTS Terrestrial Radio Access Network (UTRAN); UTRA FDD; (UMTS XX.03 version 1.3.1).

(List continued on next page.)

*Primary Examiner*—Phuong Phu
(74) *Attorney, Agent, or Firm*—Nixon & Vanderhye, PC

(57) ABSTRACT

The present invention employs one or more complementary sequences, e.g., Golay pairs of sequences, to provide accurate and efficient synchronization between radio transceivers. A matched filter corresponding to a complementary pair of sequences is used to correlate the received signal with one of the complementary pair of sequences. A peak output is detected from the matched filter, and the detected peak is used to generate a timing estimate for synchronizing transmissions between transceivers. Each of the complementary sequences has minimal aperiodic autocorrelation sidelobe values for all non-zero delays of that complementary sequence and a maximal autocorrelation main lobe value for a zero delay of that complementary sequence. The one sequence may be used as a preamble portion of a random access message transmitted by a mobile station to a base station over a random access channel. The sequence may also be used as a synchronization code transmitted by the base over a synchronization channel and used by mobile stations to obtain synchronization. An efficient Golay correlator and a bank of efficient Golay correlators for correlating respectively with a single sequence and with a set of orthogonal sequences are disclosed.

60 Claims, 12 Drawing Sheets

OTHER PUBLICATIONS

*UMTS*, as of Dec. 1998, "UTRA FDD: Transport channels and physical channels".

*UMTS*, as of Dec. 1998, "UTRA FDD, spreading and modulation description".

*UMTS*, as of Dec. 1998, "UTRA FDD: Physical layer procedures".

*ETSI STC SMG2 UMTS Layer 1 Expert* Group, Tdoc SMG2 UMTS L1 427/98, Stockholm, Sweden, Oct. 14–16, 1998, "A new correlation sequence for the Primary Synchronisation Code with good correlation properties and low detector complexity," pp. 1–7.

*IEEE Transactions on Information Theory*, Marcel J.E. Golay, Apr. 1961, pp. 82–87, "Complementary Series".

*Electronic Letters*, Jan. 31, 1991, vol. 27, No. 3, pp. 219–220, S.Z. Budisin, "Efficient Pulse Compressor for Golay Complementary Sequences".

*IEEE Electronic Letters*, vol. 35, Aug. 19, 1999, pp. 1427–1428, XP002901241WO 99/53630 A, Popovic B. M., "Efficient Golay Correlator".

*TSG–RAN Working Group 1 Meeting #3*, TSGR1#3(99)205, Mar. 22–26, 1999, pp. 1–8, XP002901242, Nynäs hamm, Sweden, Ericsson, "New RACH preambles with low auto-correlation sidelobes and reduced detector complexity".

*Database WPI*, Section EI, Week 20027, Derwent Publications Ltd., London, GB; AN 20000–310194, XP002150502 & JP 2000 091954 A (Oki Electric Ind Co Ltd), Mar. 31, 2000.

*TSG–RAN Working Group 1 Meeting No. 5*; TSGR1–567/99, No. 5, Jun. 1–4, 1999, pp. 1/6–6/6, XP002901243, Cheju, Korea, Siemens, Texas Instruments: "Generalised Hierarchical Golay Sequence for PSC with low complexity correlation using pruned efficient Golay correlators".

*IEEE Transactions on Communications*, vol. 47, No. Iss. 6, Jun. 1999, pp. 205–209, XP002901244, B.M. Popovic, "Spreading Waveforms for Multi–Carrier CDMA Systems".

* cited by examiner

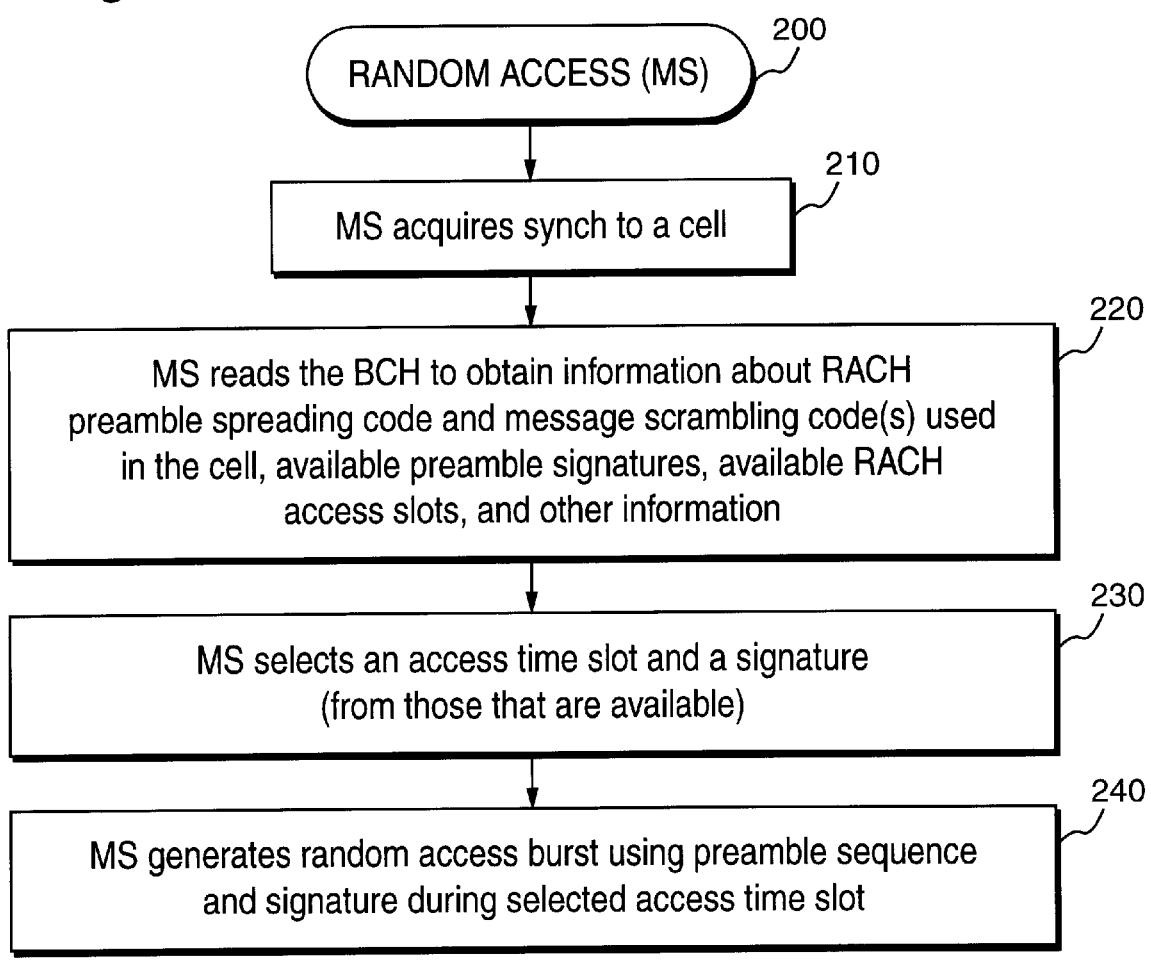

METHOD AND APPARATUS FOR EFFICIENT SYNCHRONIZATION IN SPREAD SPECTRUM COMMUNICATIONS

FIELD OF THE INVENTION

The present invention relates to telecommunications and more particularly to synchronizing transceivers in a direct sequence spread spectrum radio communications system.

BACKGROUND AND SUMMARY OF THE INVENTION

Modern communication systems, such as cellular and satellite radio systems, employ various modes of operation (analog, digital, and hybrid) and access techniques such as frequency division multiple access (FDMA), time division multiple access (TDMA), code division multiple access (CDMA), and hybrids of these techniques.

Digital cellular communications systems have expanded functionality for optimizing system capacity and supporting hierarchical cell structures, i.e., structures of macrocells, microcells, picocells, etc. The term "macrocell" generally refers to a cell having a size comparable to the sizes of cells in a conventional cellular telephone system (e.g., a radius of at least about 1 kilometer), and the terms "microcell" and "picocell" generally refer to progressively smaller cells. For example, a microcell might cover a public indoor or outdoor area, e.g., a convention center or a busy street, and a picocell might cover an office corridor or a floor of a high-rise building. From a radio coverage perspective, macrocells, microcells, and picocells may be distinct from one another or may overlap one another to handle different traffic patterns or radio environments.

An typical cellular mobile radiotelephone system includes one or more base stations (BSs) and multiple mobile stations (MSs). A base station generally includes a control and processing unit which is connected to a core network type node like a mobile switching center (MSC) which in turn is connected to the public switched telephone network (PSTN). General aspects of such cellular radiotelephone systems are known in the art. The base station handles a plurality of voice or data channels through a traffic channel transceiver which is controlled by the control and processing unit. Also, each base station includes a control channel transceiver which may be capable of handling more than one control channel also controlled by the control and processing unit. The control channel transceiver broadcasts control information over the control channel of the base station to mobiles tuned (or locked) onto that control channel.

The mobile receives the information broadcast on a control channel at its voice and control channel transceiver. The mobile processing unit evaluates the received control channel information, which includes the characteristics of cells that are candidates for the mobile to lock on to, and determines on which cell the mobile should lock. Advantageously, the received control channel information not only includes absolute information concerning the cell with which it is associated, but also contains relative information concerning other cells proximate to the cell with which the control channel is associated.

In North America, a digital cellular radiotelephone system using TDMA is called the digital advanced mobile phone service (D-AMPS), some of the characteristics of which are specified in the TIA/EIA/IS-136 standard published by the Telecommunications Industry Association and Electronic Industries Association (TIA/EIA). Another digital communication system using direct sequence CDMA PS-CDMA) is specified by the TIA/EIA/IS-95 standard, and a frequency hopping CDMA communication system is specified by the EIA SP 3389 standard (PCS 1900). The PCS 1900 standard is an implementation of the GSM system, which is common outside North America, that has been introduced for personal communication services (PCS) systems.

Several proposals for the next generation of digital cellular communication systems are currently under discussion in various standards setting organizations, which include the International Telecommunications Union (ITU), the European Telecommunications Standards Institute (ETSI), and Japan's Association of Radio Industries and Businesses (ARIB). An example third operation standard currently being proposed by ETSI is the Universal Mobile Telecommunications System (UMTS) Terrestrial Radio Access (UTRA). Besides transmitting voice information, the next generation systems can be expected to carry packet data and to inter-operate with packet data networks that are also usually designed and based on industry-wide data standards such as the open system interface (OSI) model or the transmission control protocol/Internet protocol (TCP/IP) stack. These standards have been developed, whether formally or defacto, for many years, and the applications that use these protocols are readily available.

In most of these digital communication systems, communication channels are implemented by frequency modulating radio carrier signals, which have frequencies near 800 megahertz (MHz), 900 MHz, 1800 MHz, and 1900 MHz. In TDMA systems and even to varying extents in CDMA systems, each radio channel is divided into a series of time slots, each of which contains a block of information from a user. The time slots are grouped into successive frames that each have a predetermined duration, and successive frames may be grouped into a succession of what are usually called superframes. The kind of access technique (e.g., TDMA or CDMA) used by a communication system affects how user information is represented in the slots and frames, but current access techniques all use a slot/frame structure.

Time slots assigned to the same mobile user, which may not be consecutive time slots on the radio carrier, may be considered a logical channel assigned to the mobile user. During each time slot, a predetermined number of digital bits are transmitted according to the particular access technique (e.g., CDMA) used by the system. In addition to logical channels for voice or data traffic, cellular radio communication systems also provide logical channels for control messages, such as paging/access channels for call-setup messages exchanged by base and mobile stations and synchronization channels for broadcast messages used by mobile stations or other remote terminals for synchronizing their transceivers to the frame/slot/bit structures of the base stations. In general, the transmission bit rates of these different channels need not coincide and the lengths of the slots in the different channels need not be uniform. Moreover, third generation cellular communication systems being considered in Europe and Japan are asynchronous, meaning that the structure of one base station is not temporally related to the structure of another base station and that mobile does not know any of the structures in advance.

In such digital communication systems, a receiving terminal must find the timing reference of a transmitting terminal before any information transfer can take place. For a communication system using DS-CDMA, finding the timing reference corresponds to finding the boundaries of downlink (e.g., BS-to-MS) chips, symbols, and frames. These are sometimes called downlink chip-, symbol-, and frame-synchronizations, respectively. In this context, a frame is simply a block of data that can be independently detected and decoded. Frame lengths in today's systems typically fall in the range of ten milliseconds (ms) to twenty ms. This search for BS timing may be called a "cell search," and it includes identification of BS-specific downlink scrambling codes that are features of current DS-CDMA communication systems.

A mobile or other remote terminal typically receives a signal that is a superposition (sum) of attenuated, faded, and disturbed versions of the signal transmitted by a BS. The slot and frame boundaries in the received signal are unknown to the MS to begin with, as are any BS-specific scrambling codes. The mobile therefore must detect and identify one or more BSs in the noise-like (for DS-CDMA) received signal and to identify the scrambling code used. In order to help synchronize the remote terminal to the BS and identify the BS-specific scrambling code, some communication systems provide that each BS signal includes an unscrambled part, which may be called a synchronization channel (SCH), which the MS can lock onto and perform a "cell search."

Even after downlink synchronization is achieved, synchronization also must be achieved for uplink communications (e.g., MS-to-BS). This is because of the rapidly changing radio interface between the base and mobile stations as well as "roundtrip" propagation delays to and from the base station. When the mobile desires to transmit to the base station, it sends an initial transmission over an uplink channel (e.g., a random access channel (RACH)). Because of the already-achieved downlink synchronization between the base and mobile stations, the uplink transmission is roughly or coarsely synchronized, e.g., typically within one time/access slot. For example, the base station may only allow uplink transmissions from mobiles during eight distinct time/access slots. The mobile knows generally when those time slots begin when it synchronized to the downlink signals being broadcast by the base station. The assumption therefore may be made that the mobile is out of synchronization no more than one such time/access slot. In a direct sequence spread spectrum system, such a time/access slot corresponds to a predetermined number of chips, e.g., 256 chips. In this example, the largest roundtrip propagation delay, i.e., the amount which the mobile is out of synchronization with the base station, is assumed to be 255 chips.

To achieve the synchronization, the one station's transmission includes some known signal (i.e., known to the other station). In the downlink direction, the known signal is sometimes referred to as a synchronization sequence or code or a primary synchronization sequence or code. In the uplink direction, the known signal may be referred to as a preamble sequence. In the random access, the mobile station transmits the uplink random access burst. The random access burst consists of a preamble (or preamble sequence) part and a message part. The base station RACH receiver correlates the received signal samples with the known preamble sequence. Once the maximum preamble correlation is detected by the base station RACH receiver, the base station is in synchronization and can accurately decode the substantive message from the mobile contained in the message part of RACH burst. Although only one random access synchronization code/preamble is needed for each base station, different synchronization codes/preambles associated with the base station may be used to minimize cross-correlation between uplink transmissions from different mobiles.

In any event, the synchronization code(s)/preamble(s) used for the downlink cell search or for the uplink random access synchronization should have a minimal, out-of-phase, aperiodic autocorrelation. Autocorrelation is the property which describes how well a code or sequence correlates with itself. Minimal, out-of-phase, aperiodic autocorrelation means the autocorrelation values for the non-zero time shifts (i.e., the base and mobile stations are out of synchronization by one or more chips) are low compared to the zero-time shift autocorrelation value (the base and mobile stations are chip synchronized). Non-zero time shift autocorrelation values are called autocorrelation sidelobes. A zero time shift autocorrelation value is called the autocorrelation main lobe.

One possible source for synchronization codes with unit envelope are binary or polyphase Barker codes. The main lobe to maximum sidelobe ratio for Barker codes is equal to L, where L is the code length. Unfortunately, binary Barker codes exist only for lengths 2, 3, 4, 5, 7, 11, and 13, while polyphase Barker codes are currently known for the lengths up to 45. As a result, non-optimum codes have to be used when longer preamble synchronization codes are required. For example, the preamble of random access burst signal proposed for a third generation mobile communication standard (UTRA) has a length of 4096 code chips.

Besides minimal aperiodic autocorrelation and longer code length, it is also important to efficiently generate and correlate the synchronization codes. With respect to correlation at the base station, efficiency is even more important if there are a number of different synchronization preambles/ codes which can be randomly used so that the base station random access channel receiver must correlate a received composite signal with all possible synchronization/preamble codes. In this situation, the base station receiver employs a bank of random access preamble correlators, each of which performs a large number of data processing operations— especially if the code length is long. A similar problem exists with respect to the design and detection of the downlink synchronization codes transmitted by the base station so that the mobile can identify the base station timing and obtain frame, symbol, and chip synchronization (i.e., cell search).

To achieve efficiency, the proposed UTRA random access burst preamble is generated using a serial (or hierarchical) code concatenation procedure which has the benefit of reducing the number of correlation operations. The preamble is generated using a "signature" having 16 complex symbols. There are 16 different signatures obtained from an orthogonal set of binary orthogonal Gold sequences of length 16 by multiplying each binary sequence with the constant complex number $C=(1+j)/\sqrt{2}$, where $j=\sqrt{-1}$. Each signature symbol is spread with a so-called preamble spreading code, chosen to be a 256 chips long orthogonal Gold sequence. The resulting preamble sequence therefore has a length of 4096 chips, i.e., 16×256=4096. The preamble spreading code is cell specific and is broadcast along with information about allowed signatures in its cell by the base station.

Unfortunately, the aperiodic autocorrelation properties of preambles based on serially concatenated orthogonal Gold sequences are not optimal, i.e., significant autocorrelation sidelobes are generated. Significant autocorrelation sidelobes mean that the receiver may erroneously synchronize to one of these sidelobes, and as a result, the transmitted message is not properly received.

It is therefore desirable to provide one or more synchronization sequences that for longer lengths provide minimal aperiodic autocorrelation properties and which can be generated and correlated efficiently. Such synchronization sequences could then be used advantageously in many types of spread spectrum communications applications such as downlink cell search and uplink random access.

To meet these and other objectives, the present invention provides a correlator that may be included in a first transceiver used to correlate a received signal transmitted by a second transceiver. The correlator includes a matched filter corresponding to a complementary pair of sequences to correlate the received signal with one of the complementary pair of sequences. A detector detects a peak output from the matched filter, and timing circuitry uses the detected peak output to generate a timing estimate for synchronizing transmissions between the first and second transceivers. Each of the complementary sequences has very low, aperiodic autocorrelation sidelobe values for all non-zero delays of that complementary sequence and a maximal autocorrelation main lobe value for a zero delay of that complementary sequence.

In one example application, the first transceiver may be a base station, and the second transceiver may be a mobile station. The one sequence may be used as a preamble portion of a random access burst transmitted by the mobile station to the base station over a random access channel. Alternatively, the first transceiver may be a mobile station, and the second transceiver may be a base station. The one sequence may be used as a synchronization sequence transmitted by the base station over a synchronization or other broadcast type of channel.

A plurality of such matched filters may be employed as a bank of correlators at the first transceiver with each matched filter corresponding to a complementary pair of sequences having minimal aperiodic autocorrelation sidelobe properties. This is particularly advantageous when there is a need for plural sequences from an orthogonal set to be used in the same cell, e.g., plural random access channels used, for example, to increase capacity. In a preferred example embodiment, the complementary pair of sequences is a complementary pair of binary sequences of length $L=2^N$, where N is a positive integer. The complementary pairs of binary sequences are usually called Golay complementary pairs, and sequences forming such pairs are called Golay complementary sequences. The Golay complementary pair of sequences preferably has a relatively long length, e.g., L=4096 chips.

The present invention also provides for a sequence generator that efficiently generates a pair of Golay complementary sequences of length $L=2^N$ that requires only N memory elements. A modulo $2^N$ counter having N memory elements cyclically counts from zero to $2^{N-1}$. A permutator coupled to receive and permute N parallel outputs from the counter according to a certain permutation of integers ranging from one to N. A first set of N logical AND operators produces N parallel outputs from pairs of adjacent permuted counter outputs. These outputs are then summed modulo 2 in a first summer. A second set of N logical AND operators operates on each permuted counter output and one of a set of N weighting coefficients to produce N parallel outputs. A second summer sums modulo 2 the outputs generated by the second set of N logical AND operators. A third summer sums modulo 2 the outputs of the first and second summers to produce a first binary sequence in the complementary pair of binary sequences. A fourth summer sums modulo 2 the output of the third summer and a most significant output from the permutator to produce a second binary sequence in the complementary pair of binary sequences.

In addition to an efficient synchronization sequence generator, the present invention also provides for an efficient sequence correlator for efficiently correlating a received spread spectrum signal with a pair of binary (Golay) or polyphase complementary sequences of length $L=2^N$. Such a correlator is sometimes referred to as the efficient Golay correlator (EGC). The efficient sequence correlator includes N serially concatenated processing stages, each stage having first and second parallel processing branches. Each stage of the first processing branch includes a delay line coupled to a corresponding adder. Each stage of the second processing branch includes a multiplier coupled to a subtractor. The input signal provided to the first processing branch at the particular processing stage is stored in plural memory elements of the corresponding delay line, while the content of the last memory element of the same delay line is input to the adder (in the first branch) and to the subtractor (in the second branch) of the same stage. The input signal provided to the second processing branch at the same stage is multiplied in the multiplier by a corresponding weighting coefficient. The output of the multiplier is fed to the negative input of the subtractor (in the second branch) and to the adder (in the first branch). The output of the adder is then input to the delay line in the next successive stage. The output of the subtractor is then input to the multiplier in the next successive stage. The input signals for the first and the second processing branches at the first processing stage correspond to the received spread spectrum signal.

The output of the first processing branch at the N-th processing stage produces a cross-correlation of the received spread spectrum signal with a first sequence from a complementary pair of sequences. The output of the second processing branch at the N-th processing stage produces a cross-correlation of the received spread spectrum signal with a second sequence from a complementary pair of sequences. In a preferred example embodiment, the complementary sequences are binary or Golay complementary sequences.

The present invention also provides for a memory efficient Golay correlator with substantially reduced memory for correlating a received signal using one of the sequences from a pair of complementary sequences of $L=2^N$. The one sequence from the complementary pair is represented as a concatenation of two shorter, constituent complementary sequences of length X. Each constituent sequence is repeated L/X times and is modulated by +1 or −1 according to a signature sequence of length Y=L/X. A first correlator of length X receives the spread spectrum signal and generates an intermediate pair of correlation values corresponding to the constituent complementary sequences. A first selector alternately supplies one of the intermediate pair of correlation values during each of successive time windows based on a current value of an interleaving sequence of length Y=L/X whose elements belong to the set {0,1}. The order of concatenation of the constituent sequences is determined by the interleaving sequence. A multiplier multiplies the selected intermediate correlation values with the corresponding bits of the signature sequence to generate a multiplied correlation output. The multiplied correlation output is summed with a feedback output generated by a delay line having X memory elements with the resulting sum itself being fed back to the input of the delay line. A final correlation value corresponds to the resulting sum after Y successive time windows have occurred. In a preferred example embodiment, N=12, L=4096, X=256, and Y=16, and the first correlator is an efficient Golay correlator such as the one just described above.

In yet another embodiment, this memory efficient correlator correlates the received spread spectrum signal with plural orthogonal sequences generated using plural signatures. Plural multipliers each multiply the selected intermediate correlation values with an element of a different signature sequence to generate a corresponding multiplied correlation output. Plural summers are provided with each summer corresponding to one of the multipliers and summing the multiplied correlation output with the feedback output of a corresponding delay line. After processing all the elements in the signature sequence, a final correlation value is generated for each of the orthogonal sequences. One example embodiment is disclosed in which sixteen signatures are used to generated sixteen orthogonal Golay sequences. Another example embodiment employs thirty-two signatures to generate thirty-two orthogonal Golay sequences.

As a result of the present invention, a single synchronization sequence or an orthogonal set of synchronization sequences may be provided with excellent aperiodic autocorrelation properties for relatively long sequence lengths. Equally significant, the present invention provides for efficient generation of and correlation with one synchronization sequence or an orthogonal set of such synchronization sequences. These synchronization sequences can be advantageously employed in one example application to uplink synchronization over a random access channel and downlink synchronization over a broadcast synchronization channel.

BRIEF DESCRIPTION OF THE DRAWINGS

The foregoing and other objects, features, and advantages of the invention will be apparent from the following description of preferred embodiments as well as illustrated in the accompanying drawings in which reference characters refer to the same parts throughout. While individual functional blocks and components are shown in many of the figures, those skilled in the art will appreciate that these functions may be performed by individual hardware circuits, by a suitably programmed digital microprocessor, by an application specific integrated circuit (ASIC), and/or by one or more digital signaling processors PSPs).

FIG. 9 is a flowchart illustrating procedures for a random access routine performed by a mobile station;

DESCRIPTION OF THE DRAWINGS

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. For example, while the present invention is sometimes described in the context of a mobile radio station using uplink spreading codes, the present invention is equally applicable to other radio stations, e.g., radio base stations, and indeed, to any spread spectrum communications system. In other instances, detailed descriptions of well-known methods, interfaces, devices, and signaling techniques are omitted so as not to obscure the description of the present invention with unnecessary detail.

Figure 1:
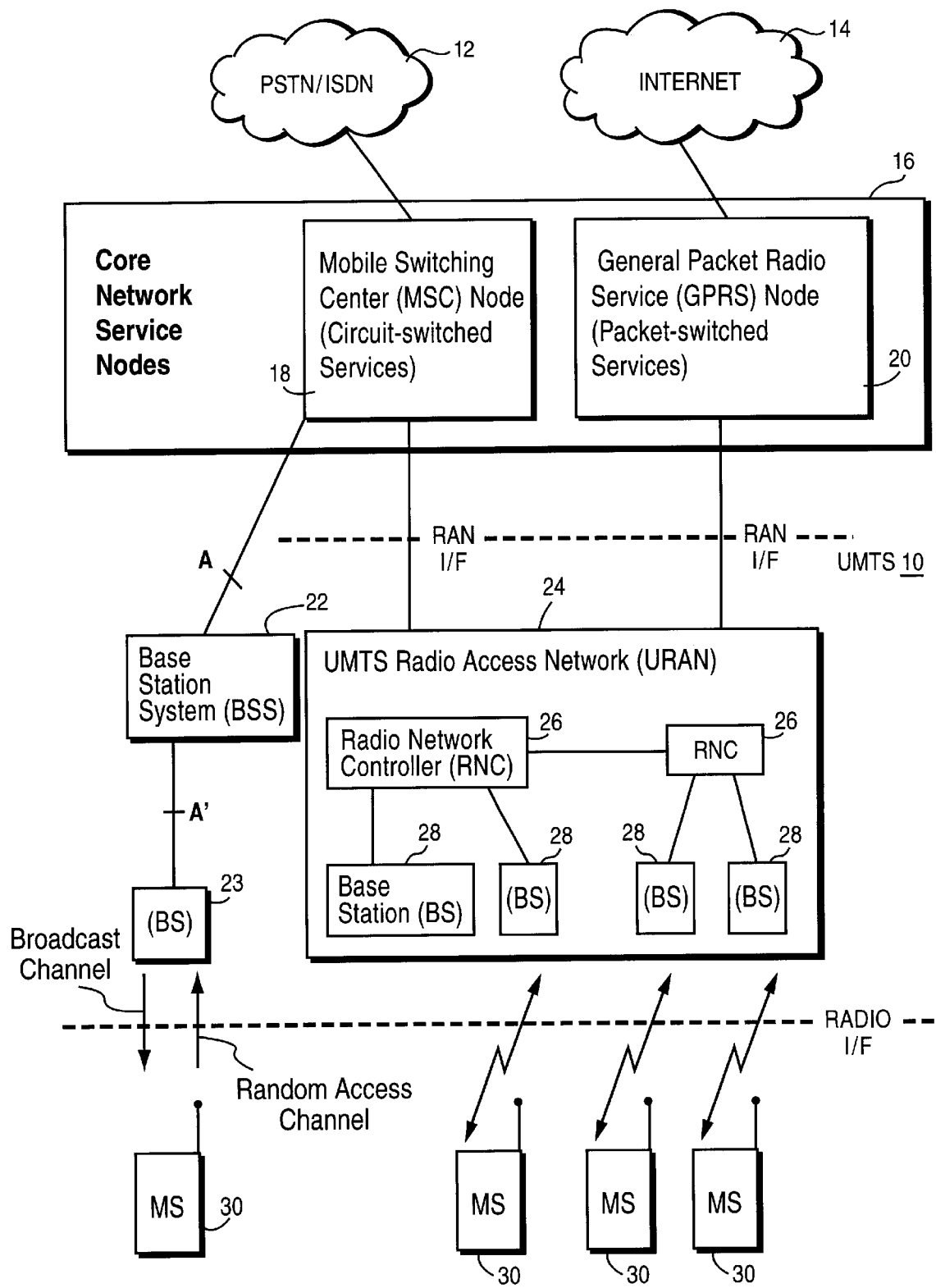
FIG. 1 is a function block diagram of an example mobile communication system in which the present invention may be advantageously employed.

The present invention is described in the non-limiting, example context of a universal mobile telecommunications system (UMTS) 10 shown in FIG. 1. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to corresponding service nodes 16. The PSTN/ISDN connection-oriented network 12 is connected to a connection-oriented service node shown as a Mobile Switching Center (MSC) node 18 that provides circuit-switched services. In the existing GSM model, the MSC 18 is connected over an interface A to a Base Station Subsystem (BSS) 22 which in turn is connected to radio base station 23 over interface A'. The Internet connectionless-oriented network 14 is connected to a General Packet Radio Service (GPRS) node 20 tailored to provide packet-switched type services. Each of the core network service nodes 18 and 20 connects to a UMTS Radio Access Network (URAN) 24 over a radio access network (RAN) interface. URAN 24 includes one or more radio network controllers 26. Each RNC 26 is connected to a plurality of base stations (BS) 28 and to any other RNC's in the URAN 24.

In the preferred embodiment, radio access is based upon wideband, Code Division Multiple Access (WCDMA) with individual radio channels allocated using CDMA spreading codes. WCDMA provides wide bandwidth for multimedia services and other high rate demands as well as robust features like diversity handoff and RAKE receivers to ensure high quality. Each mobile station 24 is assigned its own scrambling code in order for a base station 20 to identify transmissions from that particular mobile station as well as for the mobile station to identify transmissions from the base station intended for that mobile station from all of the other transmissions and noise present in the same area. A downlink (BS-to-MS) broadcast channel and an uplink (MS-to-BS) random access channel are shown.

Figure 2:
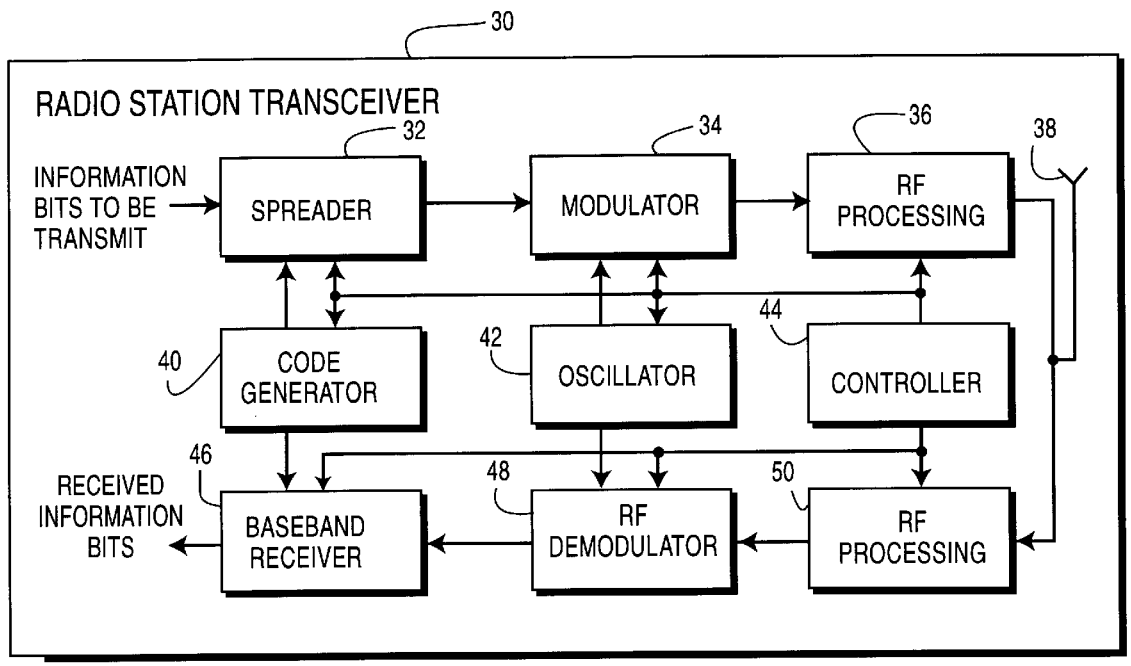
FIG. 2 is a function block diagram of an example radio station transceiver in which the present invention may be advantageously employed.

A CDMA radio station transceiver 30 in which the present invention may be employed is shown in FIG. 2 in function block format. Those skilled in the art will appreciate that other radio transceiver functions used in CDMA transceivers not relevant to the present invention are not shown. In the transmit branch, information bits to be transmit are received by a spreader 32 which spreads those information bits over the available frequency spectrum, (for wideband CDMA this frequency band could be for example 5 MHz, 10 MHz, 15 MHz or more), in accordance with a spreading code generated by a spreading code generator 40. Controller 44 determines which spreading code should be provided by code generator 40 to spreader 32. The spreading code provided by code generator 40 corresponds to a radio channel in a CDMA communications system. Because a very large number of code symbols (sometimes called "chips") may be used to code each information bit, (depending on the current data rate in a variable data rate system such as a WCDMA system), the spreading operation considerably increases the data rate thereby expanding the signal bandwidth. The spread signal is provided to a modulator 34 which modulates the spread signal onto an RF carrier. An oscillator 42 generates an appropriate radio frequency carrier at a frequency selected by the controller 44. The modulated RF signal is then filtered and amplified in RF processing block 36 before being transmitted over the radio interface by way of antenna 38.

Similar but reverse operations are carried out in the receive branch of the transceiver 30. An RF signal is received by antenna 38 and filtered in RF processing block 150. The processed signal is then RF demodulated to extract the complex baseband signal from the RF carrier in a RF demodulator 48 using a suitable RF carrier signal provided by the oscillator 44. Usually, a quadrature down-converter is used in the RF demodulator in order to decompose the received signal into real (I) and imaginary (Q) quadrature components. In this way, the phase shift of the incoming signal due to the channel fading and/or phase asynchronism between the transmitter and receiver oscillators can be detected and compensated. The RF demodulated, complex base-band signal is correlated with a preamble sequence to obtain synchronization and then de-spread in the baseband receiver 46 in accordance with a de-spreading code.

Figure 3:
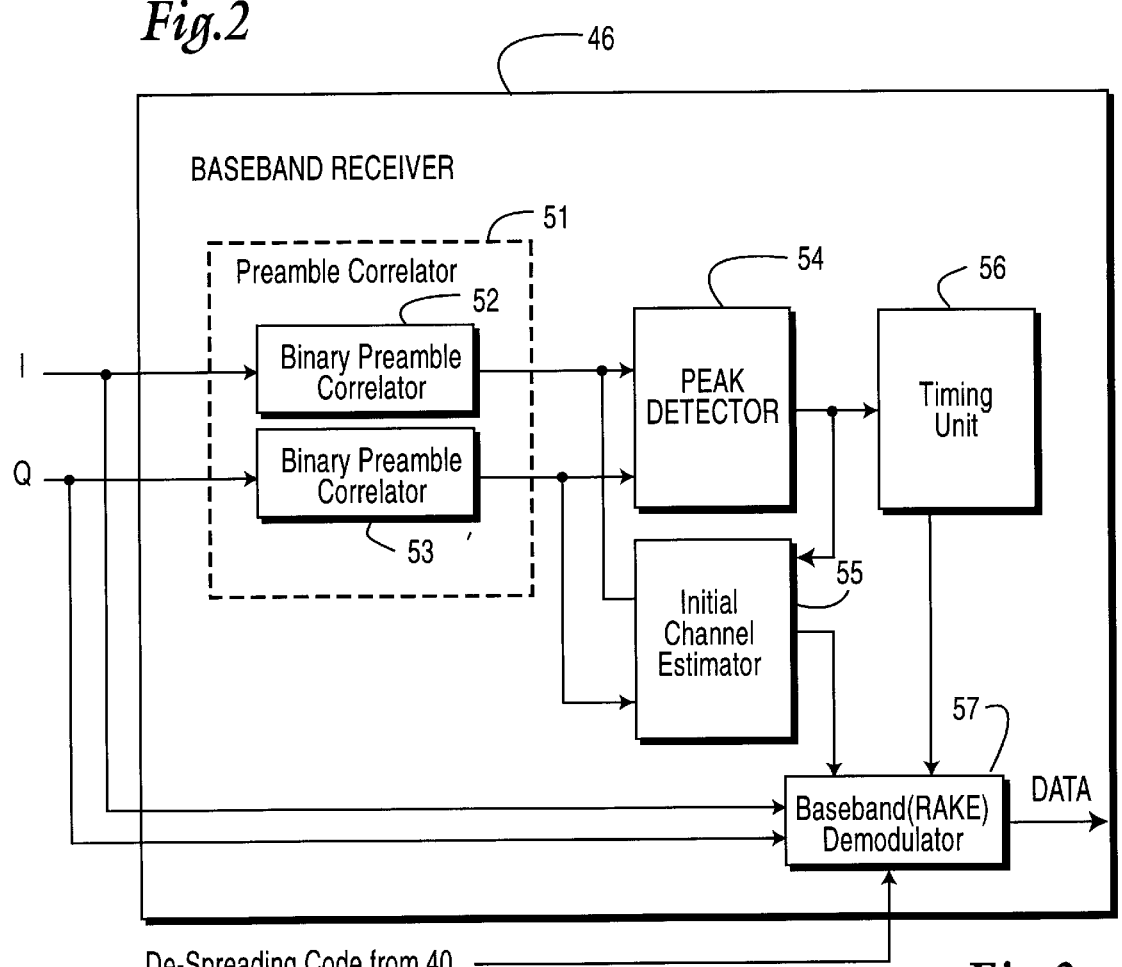
FIG. 3 is a function block diagram illustrating additional details of the baseband processing block in the receiver chain of the radio station transceiver shown in FIG. 2.

Reference is now made to FIG. 3 which shows the baseband receiver 46 in further detail. The synchronization preamble is a binary sequence, and the preamble matched filter/correlator 51 includes two identical binary preamble correlators, one (52) correlating the I branch of the received baseband signal and the other (53) correlating the Q branch of the same signal. The preamble sequence is incorporated in the preamble matched filter 51 while the de-spreading code is generated by the code generator 40.

The received, complex, baseband preamble signal is correlated in the corresponding synchronization preamble correlator 51 in order to achieve exact synchronization with the incoming signal, and to obtain the initial values of the fading channel coefficients used and tracked later on in a baseband (RAKE) demodulator 57. The timing information is obtained in the peak detector 54 by comparing the absolute correlation value calculated from the real and imaginary correlators 52 and 53 with a threshold. The peak detector 54 provides the delays (relative to the receiver timing) of the various multipath components of the received signal. The timing unit 56 uses this information to compensate the mutual delays of multipath components before their combination and demodulation in the base-band (RAKE) demodulator. The complex correlation values corresponding to the detected correlation peaks are stored in initial channel estimator 55 and used as the initial fading channel coefficients to be canceled in the baseband demodulator 57.

The present invention utilizes one or more synchronization sequences from complementary pairs of sequences. A fundamental property of a complementary pair of sequences is that the sum of their aperiodic autocorrelation functions equals zero for all non-zero time shifts. In the preferred example embodiment, the synchronization sequences are based on binary, i.e., Golay, complementary sequences. Advantageously, the Golay complementary sequences may be constructed for any length $L=2^N$, where N is any positive integer, and also for lengths 10 and 26, or for any combination of these lengths. In addition to having the possibility for long sequence lengths, many Golay complementary sequences have low aperiodic autocorrelation sidelobes. While the following text focuses on Golay complementary sequences for purposes of description only, many aspects of the invention encompass any sequence belonging to pairs of arbitrary complementary sequences.

If the sequences are of length $L=2^N$, there is a general method to construct polyphase complementary pairs of sequences, where the Golay complementary pairs of sequences are a special binary case, i.e., biphase. That general construction is defined by the following recursive relation.

$$a_0(k)=\delta(k)$$

$$b_0(k)=\delta(k)$$

$$a_n(k)=a_{n-1}(k)+W_n \cdot b_{n-1}(k-D_n)$$

$$b_n(k)=a_{n-1}(k)-W_n \cdot b_{n-1}(k-D_n), \quad (1)$$

where $k=0,1,2,\ldots,2^N-,$ $n=1,2,\ldots,N,$ $D_n=2^{P_n}$, and where $a_n(k)$ and $b_n(k)$ are two complementary sequences of length $2^N$, $\delta(k)$ is the Kronecker delta function, k is an integer representing the time scale, n is the iteration number, $D_n$ is a delay, $P_n$, $n=1,2,\ldots,N$, is any permutation of numbers $\{0,1,2,\ldots,N-1\}$, and $W_n$ is an arbitrary complex number of unit magnitude.

If $W_n$ has values +1 and −1, the binary (Golay) complementary sequences are obtained. Taking all possible permutations $P_n$ and all $2^N$ different vectors $W_n$, (n=1,2,\ldots, N),it is possible to construct $N!2^N$ different complementary pairs. However, the number of different Golay sequences of length $2^N$ is $N!2^{N-1}$.

If the delays are not powers of two as defined in equation (1), and/or if all the weighting coefficients $W_n$ do not have the same magnitude, the construction in equation (1) produces multilevel complementary pairs. However, many aspects of the present invention also apply to multilevel complementary pairs.

Figure 4:
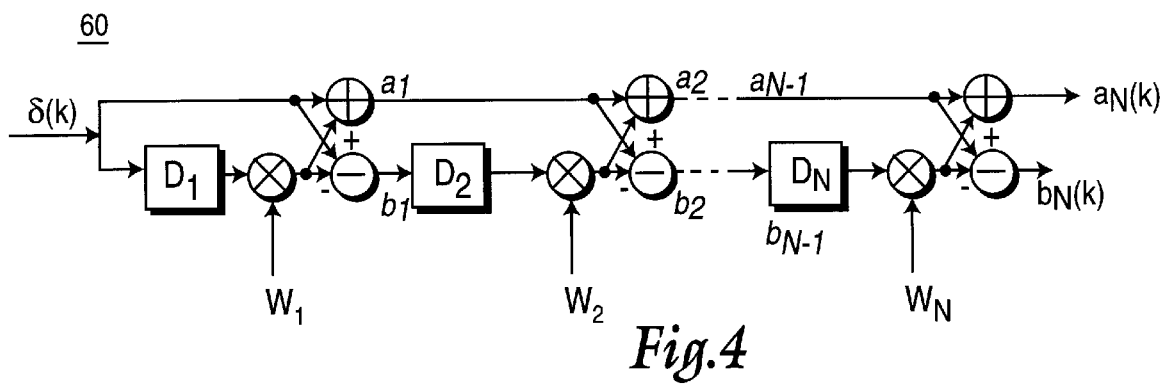
FIG. 4 is a diagram of a recursive Golay sequence generator.

A general recursive scheme for the simultaneous generation of both sequences $a_N(k)$ and $b_N(k)$ from the complementary pair is shown in FIG. 4. While the recursive Golay sequence generator 60 shown in FIG. 4 produces the pair of complementary Golay sequences $a_N(k)$ and $b_N(k)$ as defined in equation (1), it requires a large number of memory elements, especially for longer codes. For example, for sequences of length L=4096 and N=12, twelve delay lines ($D_1$–$D_{12}$) are required, where the first delay line has $D_1$ memory elements, the second delay line has $D_2$ memory elements, and so on. The total number of memory elements is therefore equal to $L-1=2^N-1$, because according to equation (1)

$$D_1+D_2+\ldots+D_N=1+2+4+\ldots+2^{N-1}=2^N-1.$$

A more efficient (and therefore preferable but not necessary) means to generate Golay complementary sequences is now described.

Figure 5:
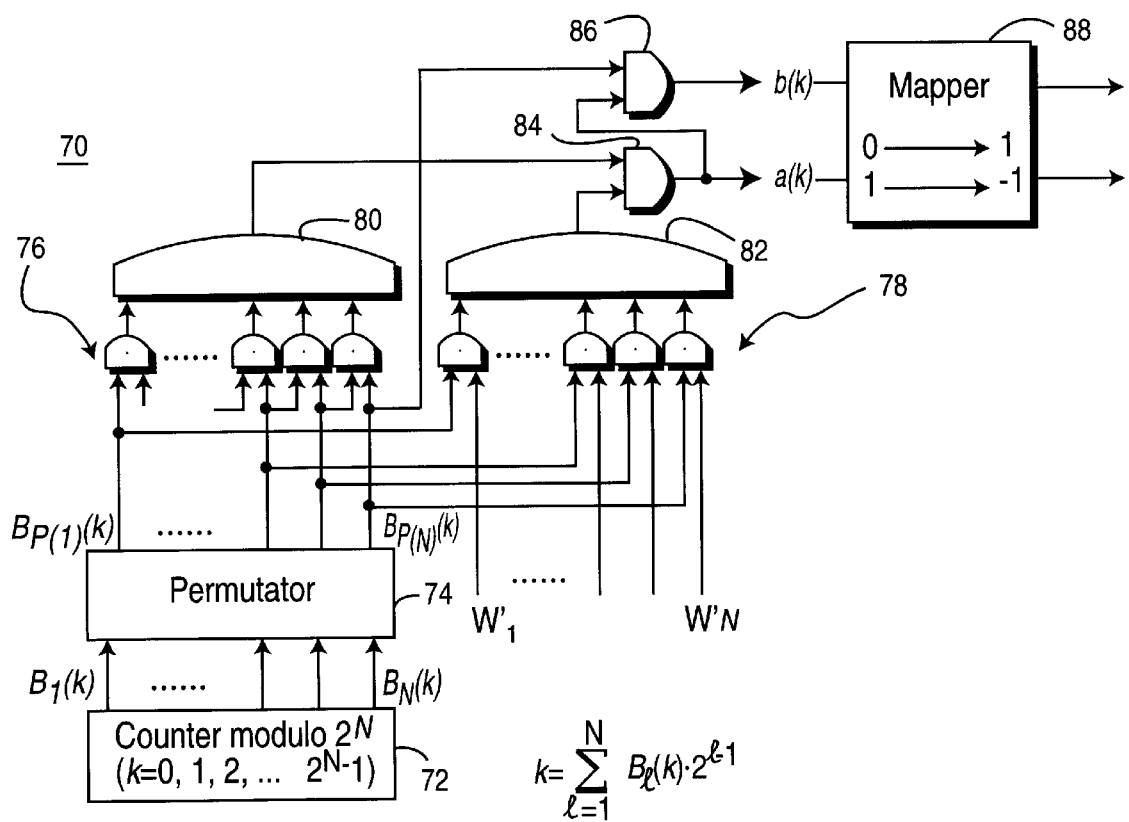
FIG. 5 is a diagram of a direct Golay sequence generator.

The direct Golay complementary sequence generator illustrated in FIG. 5 produces exactly the same pair of Golay complementary sequences as the recursive Golay sequence generator 60 shown in FIG. 4. The direct Golay sequence generator 70 includes a modulo $2^N$ counter 72 which includes only N memory elements which permit cyclic counting from zero to $2^N-1$. The counter 72 parallel outputs correspond to the binary representation of the positive integer variable k, where $$k = \sum_{l=1}^{N} B_l(k)2^{l-1}.$$

A permutator 74 is coupled to receive N parallel outputs $B_1(k)\ldots B_N(k)$ and permute those N parallel outputs according to a certain permutation of integers ranging from one to N. The permutation vector employed in the permutator 74 is obtained by adding 1 to all numbers in the permutation used in equation (1). A first set of N–1 AND gates 76 produces N–1 parallel outputs from pairs of adjacent outputs from the permutator 74. A first summer 80 sums modulo 2 the outputs generated by the first set of AND gates 76. A second set of AND gates 78 logically AND each output from the permutator 74 with one of a set of N weighting coefficients $W_1'\ldots W_N'$ which are obtained by mapping 1→0 and −1→1 using the binary vectors We employed in equation (1). A second summer 82 sums modulo 2 to the outputs generated by the second set of AND gates 78. A third summer 84 sums modulo 2 the outputs of the first and second summers to produce a first binary sequence in the complementary pair of binary sequences. A fourth summer 86 sums modulo 2 the output of the third summer 84 and the most significant output from the permutator 74, i.e., $B_{P(N)}(k)$ to produce a second binary sequence in the complementary pair of sequences. A mapper 88 transforms the first and second binary sequences having elements from the alphabet {0,1} into corresponding elements from the alphabet {−1,1}.

The direct Golay complementary sequences generator 70 is memory efficient and has fairly low complexity, e.g., complexity similar to a conventional linear feedback shift-register sequence (m-sequence) generator. These qualities make generator 70 particularly attractive as a sequence generator in the random access burst transmitter of the mobile terminal and also in the base station transmitter.

Figure 6:
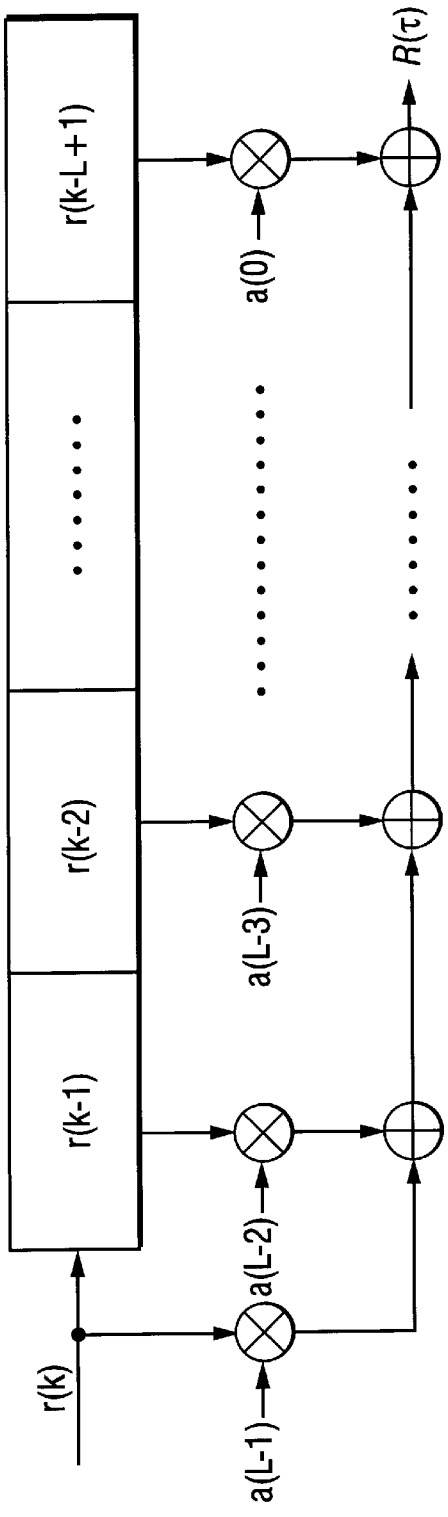
FIG. 6 is a diagram of a general type of correlator.

At the receiver, the received spread spectrum signal must be correlated with the transmitted Golay complementary sequences in order to detect the exact time when the complete sequence is received. Since the transmitted Golay complementary sequence is chosen to have minimal aperiodic autocorrelation, the likelihood that the detected maximum correlation value corresponds to the autocorrelation main lobe is very high. A general, straightforward implementation of a correlator 90 matched to the arbitrary synchronization sequence is illustrated in FIG. 6.

The received signal r(k) is provided to a delay line having L−1 memory elements. Each input signal and each memory element stage provides an input to L multipliers for correlation with the sequence represented by a(L−1), a(L−2), a(L−3), . . . a(0). The outputs of the multipliers are summed to provide the correlation output signal R(τ). The Golay correlator 90, while satisfactory to perform the correlation, is quite costly in terms of memory and data processing. For example, if L=4096, 4095 memory elements, 4096 multipliers, and 4095 summers are required.

Figure 7:
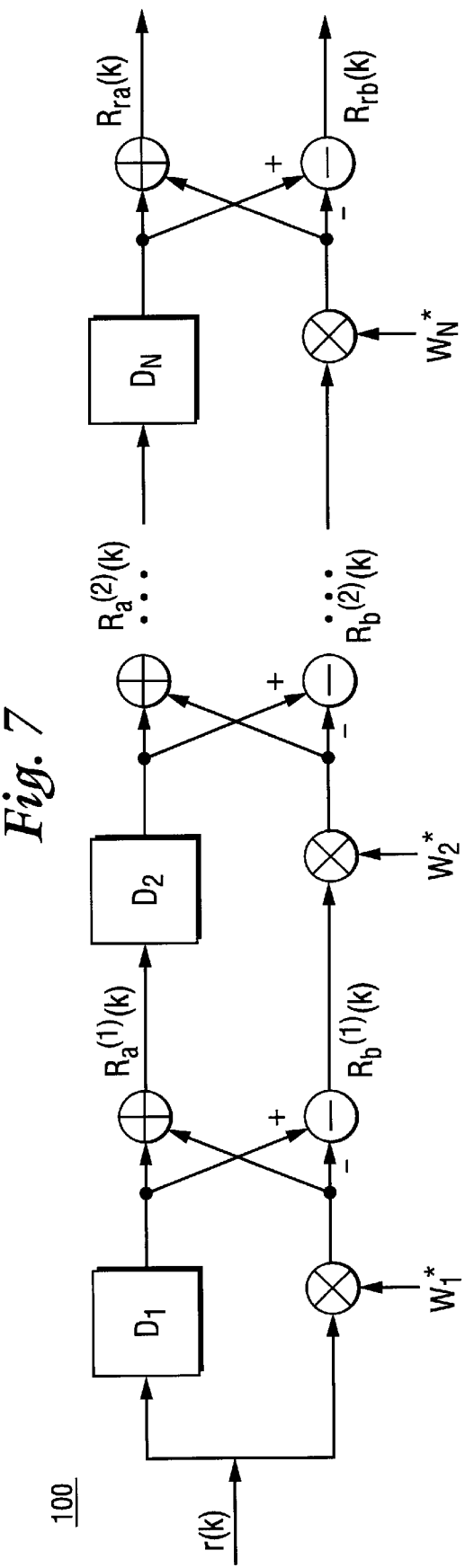
FIG. 7 is a diagram of an efficient Golay correlator.

Accordingly, a preferred embodiment of the present invention employs an efficient Golay correlator (EGC) 100 illustrated in FIG. 7. Functionally, the efficient Golay correlator 100 is a matched filter directly corresponding to the complementary sequences $a_N(k)$ and $b_N(k)$ defined by equation (1) What makes this correlator 100 particularly attractive is that it employs considerably less memory and fewer data processing operations than required with the general correlator 90 shown in FIG. 6.

The efficient Golay correlator 100 performs the correlation of the input signal r(k) simultaneously with the two complementary sequences $a_N(k)$ and $b_N(k)$. The two matched filter correlator outputs $R_{ra}(\tau)$ and $R_{rb}(\tau)$ are the corresponding aperiodic cross-correlation functions, i.e., values representing the degree to which the received signal r(k) matches the two sequences $a_N(k)$ and $b_N(k)$. The matched filter/correlator 100 uses the complex-conjugates of the weighting coefficients $W_n$ defined in equation (1), denoted as $W_n^*$.

The efficient Golay correlator 100 therefore correlates the received spread spectrum signal r(k) to the pair of Golay complementary sequences of length $L=2^N$ using N serially concatenated processing stages, each stage having first and second parallel processing branches. The input signal $R_a^{(n-1)}(k)$ provided to the first processing branch at each processing stage is stored in the first memory element of the corresponding delay line $D_n$, (where n=1, . . . , N), while the content of the last memory element of the same delay line $D_n$ is input to the adder (in the first branch) and to the subtractor (in the second branch) of the same processing stage. The input signal $R_b^{(n-1)}(k)$ provided to the second processing branch at the same stage is multiplied in the multiplier by a corresponding weighting coefficient $W_n^*$, which is the complex conjugate of the weighting coefficient $W_n$ defined for equation (1). The output of the multiplier is fed to the negative input of the subtractor and to the adder in the first branch. The output $R_a^{(n)}(k)$ of the adder is input to the delay line in the next successive stage. The output $R_b^{(n)}(k)$ of the subtractor is input to the multiplier in the next successive stage. The input signals $R_a^{(0)}(k)$ and $R_b^{(0)}(k)$ for the first and second processing branches at the first processing stage correspond to the received spread spectrum signal r(k).

The output of the first processing branch at the N-th processing stage produces a cross-correlation $R_{ra}(k)$ of the received spread spectrum signal with the first sequence $a_N(k)$ of the Golay complementary pair of sequences. The output of the second processing branch at the N-th processing stage produces a cross-correlation $R_{rb}(k)$ of the received spread spectrum signal with the second sequence $b_N(k)$ from the Golay complementary pair.

The number of multiplications in the EGC is equal to $\log_2(L)$. In contrast, a straightforward matched filter implementation of a Golay sequence correlator 90 shown in FIG. 6 would require a much larger number of multiplications corresponding to 2·L. Note the straightforward implementation 90 requires two correlators to correlate a complementary pair while the efficient Golay correlator 100 simultaneously correlates a complementary pair. The number of additions in the efficient Golay correlator 100 is 2·log$_2$(L), less than in the straightforward matched filter implementation 90 where it would be 2·(L−1). The number of memory elements required for the efficient Golay correlator 100 is L−1 but the general correlator 90 shown in FIG. 6 requires two sets (2(L−1)) of memory elements to correlate the pair of sequences. Thus, the efficient Golay correlator 100 saves IC space, reduces processing operations, saves power, and reduces cost.

Figure 8A:
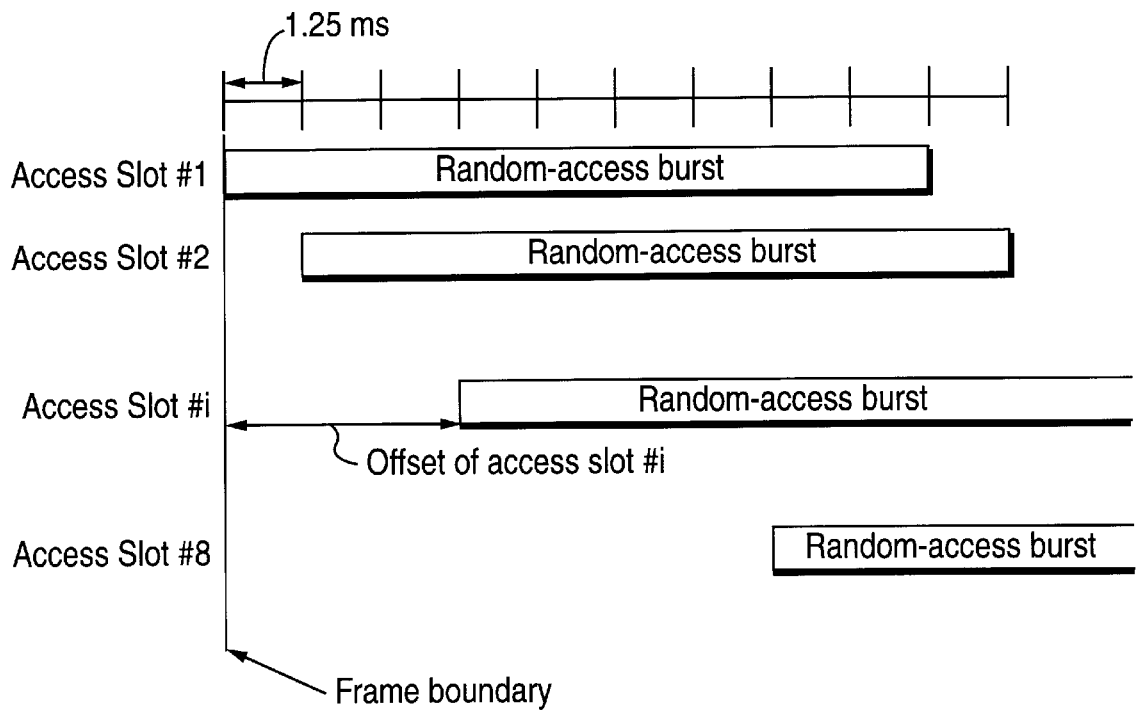
FIGS. 8A and 8B show a signaling format of random access bursts over a random access channel.
Figure 8B:
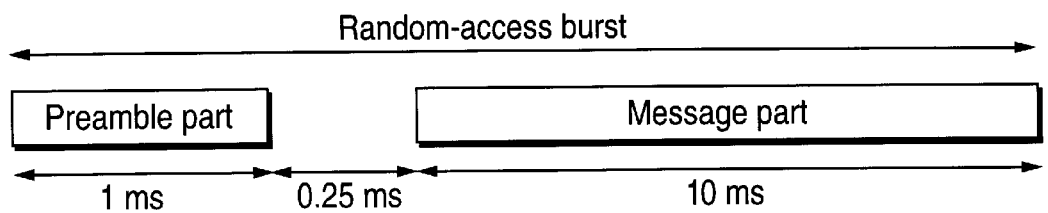

The present invention has particularly advantageous, non-limiting application in providing synchronization between a mobile station and a base station when the mobile station sends a message over a random access channel corresponding to the base station. One example format of such a random access channel is now described in conjunction with FIGS. 8A and 8B. The random access channel format is based on a slotted ALOHA approach where a mobile station can make a transmission on the random access channel at a number of well defined time offsets relative to a particular frame boundary. The different time offsets are shown as access slots and are spaced 1.25 milliseconds apart. Information on what access slots are available in the current cell is broadcast by the base station on a downlink broadcast channel. The frame boundary is also defined by the broadcast channel of the current cell. The random access burst includes two portions: a preamble portion having a length of one millisecond and a message portion having a length of ten milliseconds. Between the preamble and the message, there may be an idle time period, e.g., 0.25 milliseconds, which allows for the detection (correlation) of the preamble and subsequent online processing of the message.

A random access procedure performed by the mobile station is now described in conjunction with the random access (MS) routine (block 200) shown in FIG. 9. Initially, the mobile station must acquire synchronization to a particular base station cell (block 210). As described in the background, the mobile station performs this initial synchronization during a cell search for a base station to which it has the lowest path loss. The mobile station tunes to base station broadcast channel and processes the broadcast signal to detect a synchronization sequence. In one example embodiment, the synchronization is broken up into two steps. In the first step, the mobile detects a primary synchronization sequence which is common to all base stations. Once the strongest or maximum correlation is detected, the mobile station executes a second step where it correlates a secondary synchronization sequence particular to this base station.

After acquiring synchronization to a particular cell, the mobile station acquires from the downlink broadcast channel information regarding the random access preamble spreading code and message scrambling code(s) used in this particular cell along with the information about available preamble signatures, available random access channel access slots, and other information (block 220). The mobile station then selects an access time slot and a signature from those that are available (block 230). Thereafter, the mobile station generates a random access burst using the signature and the preamble spreading code during the selected access time slot (block 240).

Figure 10:
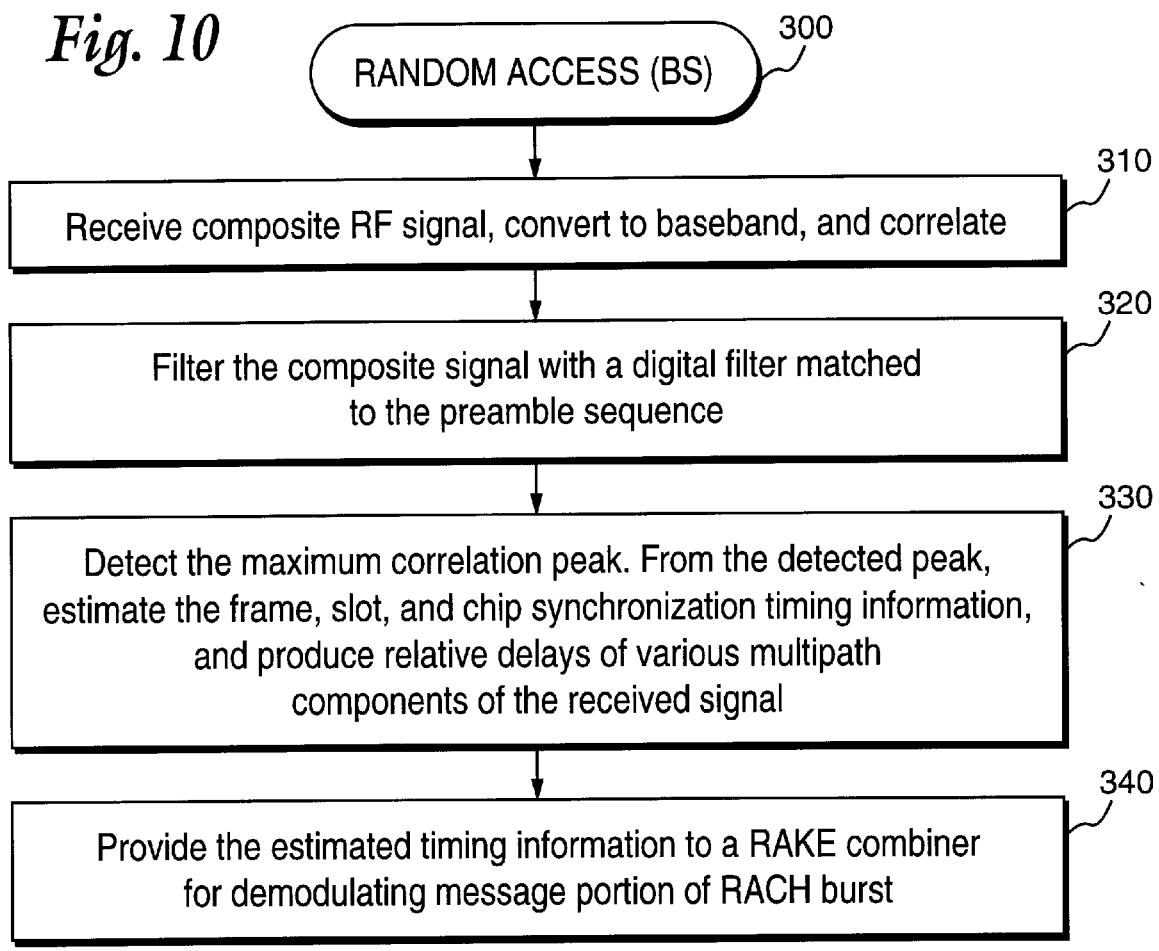
FIG. 10 is a flowchart illustrating a random access routine performed by a base station.

The random access bursts transmitted by the mobile station must be received and properly correlated at the base station as described in conjunction with the random access (BS) routine (block 300) illustrated in flowchart format in FIG. 10. The base station receives a composite RF signal, converts that signal to baseband, and correlates the baseband signal with one or more preamble sequences (block 310). In particular, the base station employs a matched filter type correlator to correlate the baseband composite signal with the preamble sequence (block 320 ). The maximum correlation peak is then detected and used to estimate the frame, slot, and chip synchronization timing information. The peak detector (e.g., 54) provides the relative (with respect to the receiver timing) delays of the various multipath components of the received signal (block 330). The estimated timing information is provided to a RAKE combiner (e.g., 57) for demodulating the message portion of the random access channel burst (block 340). The timing unit (e.g., 56) compensates the mutual delays of multipath components before their combination and demodulation in the RAKE demodulator (e.g., 57). The complex correlation values corresponding to the detected correlation peaks are used as the initial fading channel coefficients to be canceled in the RAKE demodulator.

Figures 11, 12:
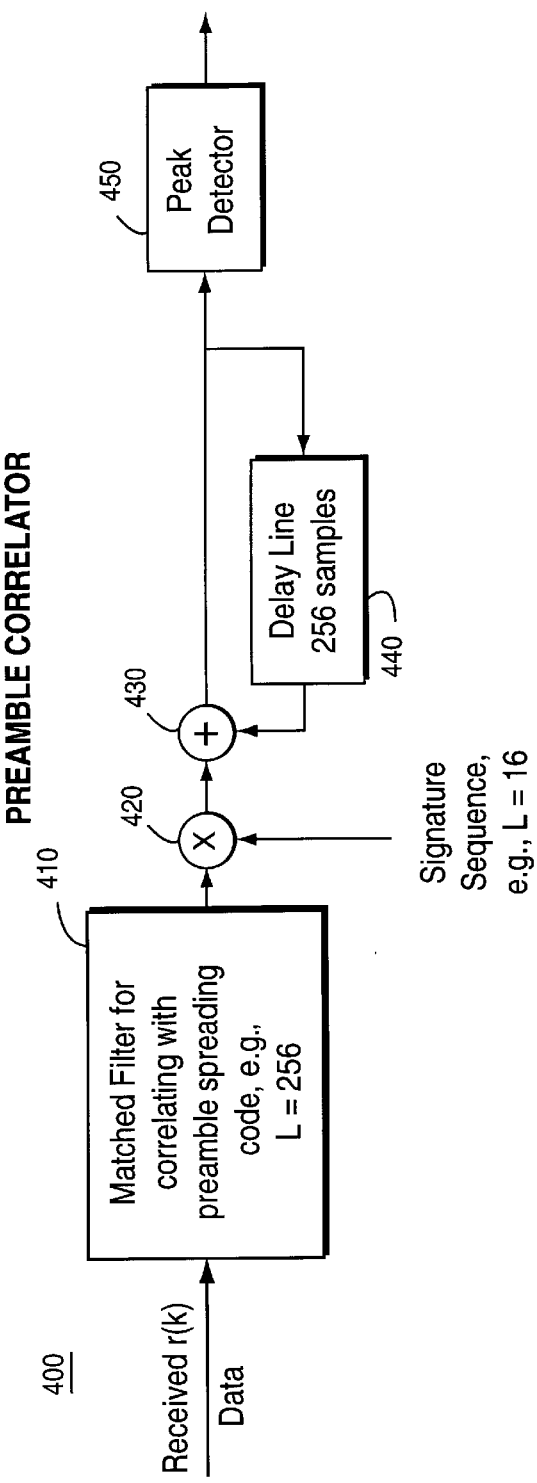
FIG. 11 is a diagram of a particular random access channel preamble correlator based on concatenated sequences.
FIG. 12 is a random access preamble correlator also based on concatenated sequences in which an example embodiment of the present invention is incorporated.

The random access channel (RACH) preamble correlator 400 illustrated in FIG. 11 is particularly efficient in terms of the amount of memory it uses. Efficiency is achieved by serially (hierarchically) concatenating a signature binary sequence and a preamble spreading code, i.e., each binary bit of the signature sequence is spread by the same preamble spreading code. The received signal is correlated in the matched filter 410 with the preamble spreading code having, for example, a length of $T_{max}$=256 chips. The intermediate correlation value produced by the matched filter 410 is then multiplied in multiplier 420 with an element of a signature sequence (provided by the base station over the broadcast channel) having for example a length of sixteen. A summer 430 sums the output of multiplier 420 with the output of a delay line 420 having the same number of elements as the length of the matched filter, e.g., 256. The output of the summer 430 is input to the delay line 440 as well as provided to a peak detector 450. The preamble correlator 400 operates as desired under the condition that the expected delay τ of the received signal r(k) is limited to be $|\tau|<T_{max}$, where $T_{max}$ is the length of preamble spreading code.

The correlation operation is synchronized with a time window, e.g., 256 chips, during which the random access burst is expected to be received. The time window length assumes that the mobile station has already attained downlink or primary synchronization with the base station. For each successive 256 chip window, the 256 correlation values generated by the matched filter 410 for that window are multiplied by one symbol of the sixteen symbol length signature sequence. The next symbol in the signature sequence is then selected at the beginning of the next 256 chip time window. The multiplied correlation values are summed with the result of the previous summation performed at the same relative time position in the previous time window. The result of the previous summation is obtained from the output of the delay line 440 and the result of that current summation thereafter is then stored in the delay line 440. The final correlation values output to the peak detector 450 is provided after sixteen time windows, i.e., sixteen repetitions of the summations at each time position within the 256 chip time window. The full correlation peak is therefore equal to 4096 because in each iteration an intermediate correlation peak of value 256 is integrated. The peak detector 450 receives the correlation values both from I and Q receiver branches and calculates the absolute correlation value or squared absolute correlation value. The peak detector 450 is connected to the rest of the RACH receiver as shown for example in FIG. 3.

The RACH preamble correlator 400 is particularly efficient because it requires considerably less memory than a conventional correlator. For example, if L=4096, the RACH preamble correlator 400 requires just 511 memory elements, while the general correlator 90 shown in FIG. 6 would require 4095 memory elements.

The reduced memory benefits of the structure of the preamble correlator 400 are advantageously employed to implement a memory efficient Golay sequence correlator 500 shown in FIG. 12 and having a structure similar to that shown in FIG. 11. Correlator 500 reduces the number of additions and multiplications required. The efficient Golay correlator 500 shown in FIG. 12 is based on the representation of a Golay sequence of length $L=2^N=2^J \cdot T_{max}$ as a function of two shorter, constituent complementary sequences A(k) and B(k) of length $T_{max}$. This function is a consequence of the general recursive construction in equation (1) of a complementary pair of sequences. Namely, if the general recursive construction starts from the arbitrary pair of complementary sequences, i.e., if the initial vectors $a_0(k)$ and $b_0(k)$ are taken to be $$a_0(k)=A(k),$$

$$b_0(k)=B(k), k=0,1,2,\ldots,T_{max}-1,$$

where A(k) and B(k) are the two complementary sequences of length $T_{max}$, the resulting pair of complementary sequences of length $L=2^N=2^J \cdot T_{max}$ is generated after J iterations. All delays $D_n$ in equation (1) are multiplied by the length of constituent sequences ($T_{max}$).

The received signal r(k) is preferably received by an efficient Golay correlator 510 shown in FIG. 7, having for example a length L=256 chips. The efficient Golay correlator 510 generates two cross-correlation values $R_{r_A}(\tau)$ and $R_{r_B}(\tau)$ corresponding to the Golay complementary pair of sequences. A switch or selector 520 receives the two correlation values. A control signal, referred to as an "Interleaving signal," controls the selector 520 to select either the $R_{r_A}(\tau)$ correlation value if a "0" is provided or the $R_{r_B}(\tau)$ correlation if a "1" is provided. Selector 520 thereby alternately supplies one of the intermediate pairs of correlation values during each of successive time windows based on the current value of the interleaving sequence. The order of concatenation of the shorter constituent sequences is determined by the interleaving sequence. The interleaving sequence in this example where the signature has length sixteen also has a length equal to sixteen. The output of the selector 520 is then multiplied in multiplier 420 by one of the symbols of the signature corresponding to the current 256 chip timing window in multiplier 420. The operations performed in multiplier 420, summer 430, delay line 440, and peak detector 450 are similar to that described with respect to FIG. 11. As in the case of the scheme from FIG. 11, the memory efficient Golay correlator 400 operates as desired under the condition that the expected delay τ of the received signal r(k) is limited to be $|\tau| < T_{max}$, where $T_{max}$ is the length of constituent complementary sequences.

While the correlator 500 has the same number of memory elements as the correlator 400 shown in FIG. 11, it has a significantly smaller number of multipliers and adders. Overall efficiency is improved because of the greater efficiency of the EGC 510 used instead of the matched filter preamble spreading code correlator 410 in FIG. 11.

In cells where higher capacity is desirable, it is useful to construct a set of plural synchronization sequences. More synchronization sequences provide for the possibility of more capacity. Preferably, the sequences in such a set should be orthogonal to minimize cross-correlation. The invention provides for the efficient generation of orthogonal sets of Golay sequences from the recursive construction of equation (1).

A set of orthogonal Golay sequences can be generated from equation (1) for each permutation $P_n$, i.e., for each set of the delays $D_n$, by choosing an appropriate set of $L/2=2^{N-1}$ vectors W(v,n) of length N, i.e., $v=0,1,\ldots,2^{N-1}-1$ and $n=1,2,3,\ldots,N$. Each vector W(v, n) produces a pair of complementary Golay sequences. As a result, a total of $2^N$ sequences are provided in the orthogonal set of Golay sequences of length $2^N$.

The set of $2^{N-1}$ vectors W(v, n) of length N which produces from equation (1) the orthogonal set of Golay sequences may be generated, for example, in two different ways. A first algorithm is $$W(v,n)=(-1)^{B_{N-n+1}(2v)}, v=0,2,\ldots,2^{N-1}-1, n=1,2,3,\ldots,N, \quad (2a)$$

where $B_n(x)$ is the n-th bit in the N-bits long binary representation of some positive integer x, i.e., $$x = \sum_{n=1}^{N} B_n(x) \cdot 2^{n-1} \quad (2b)$$

The second algorithm is given by $$W(v,n)=(-1)^{B_{N-n+1}(2v+1)}, v=0,1,\ldots,2^{N-1}-1, n=1,2,3,\ldots,N. \quad (2c)$$

Consider the following illustrative example. Assume that an orthogonal set of Golay sequences of length $L=8=2^3$, where N=3, is to be obtained using equation (1). Starting from any permutation $P=\{P_0, P_1, P_2\}$ of numbers $\{0,1,2\}$, let $P=\{0,2,1\}$. The necessary weighting vectors W(v,n) of length 3 are obtained from equation (2a) and are given in the following Table 1.

TABLE 1

| n | 1 | 2 | 3 |
|---|---|---|---|
| W(0,n) | 1 | 1 | 1 |
| W(1,n) | 1 | -1 | 1 |
| W(2,n) | -1 | 1 | 1 |
| W(3,n) | -1 | -1 | 1 |

The resulting orthogonal set S(u,k) of Golay sequences of length 8 is given in Table 2.

TABLE 2

| k | 0 | 1 | 2 | 3 | 4 | 5 | 6 | 7 |
|---|---|---|---|---|---|---|---|---|
| S(0,k) | 1 | 1 | 1 | 1 | 1 | -1 | -1 | -1 |
| S(1,k) | 1 | 1 | -1 | -1 | 1 | -1 | 1 | -1 |
| S(2,k) | 1 | 1 | 1 | 1 | -1 | 1 | 1 | -1 |
| S(3,k) | 1 | 1 | -1 | -1 | -1 | 1 | -1 | 1 |
| S(4,k) | 1 | -1 | 1 | -1 | 1 | 1 | -1 | -1 |
| S(5,k) | 1 | -1 | -1 | 1 | 1 | 1 | 1 | 1 |
| S(6,k) | 1 | -1 | 1 | -1 | -1 | -1 | 1 | 1 |
| S(7,k) | 1 | -1 | -1 | 1 | -1 | -1 | -1 | -1 |

To obtain corresponding quadriphase codes, each Golay sequence may be multiplied with the constant complex number $(1+j)/\sqrt{2}$, where $j=\sqrt{-1}$.

Figure 13:
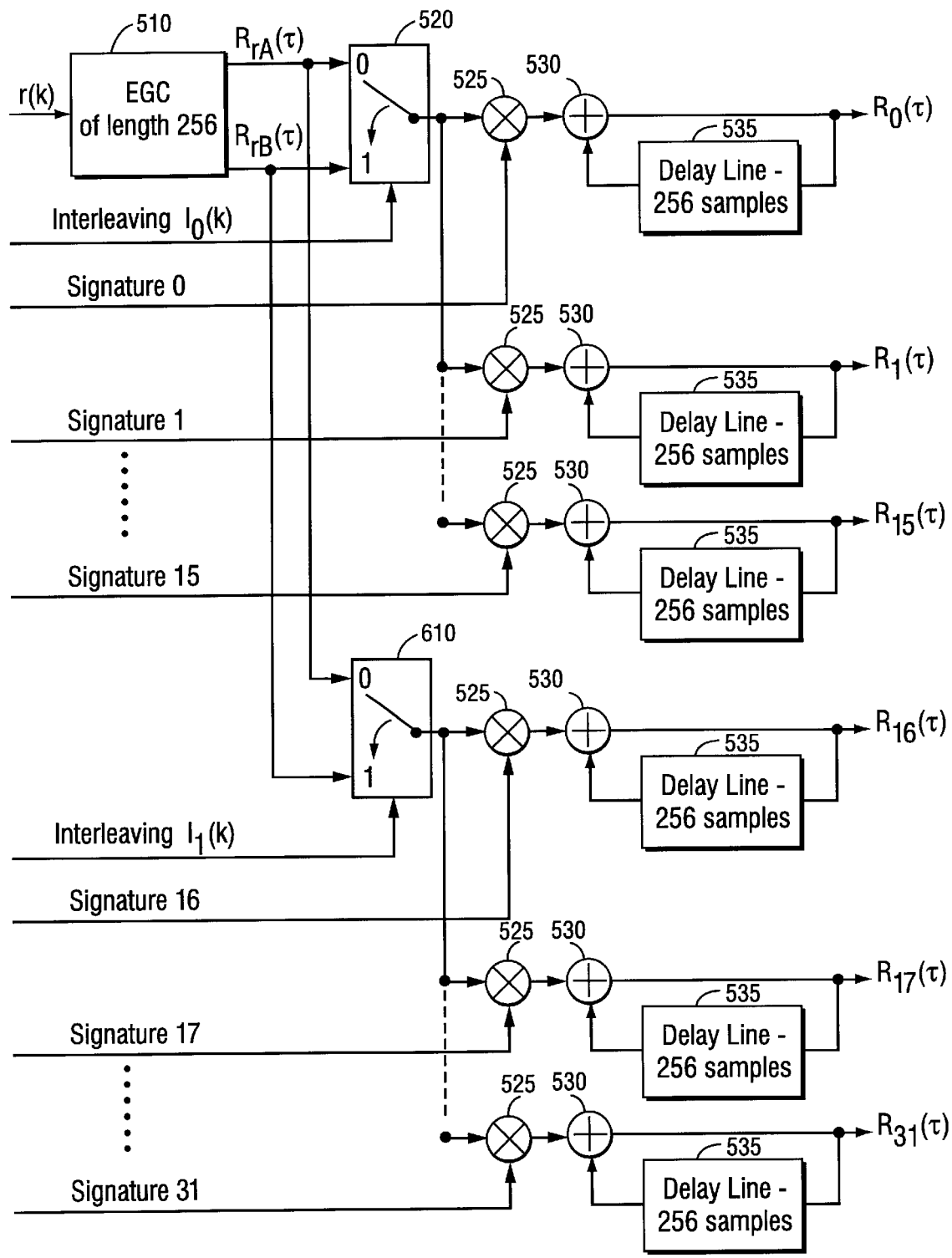
FIG. 13 is a diagram showing a bank of random access preamble correlators in which an example embodiment of the present invention is employed.

A specific, advantageous application of orthogonal Golay sequences to RACH preambles is now described in conjunction with the memory efficient Golay correlator illustrated in FIG. 13. FIG. 13 shows a preferred example embodiment of the invention implementing a RACH preamble correlator 600 where more than one preamble sequence may be used. Each of the thirty-two correlators shown in the bank of correlators in FIG. 13 operates similarly to the correlator 500 shown in FIG. 12. If the constituent sequences are of length $T_{max}=256$, the permutation vector $P_n$, and the weighting vectors $W_n$ are of length 4, the resulting total length of each sequence in complementary pair is 4096. The resulting Golay sequences consist of sequences A(k) and B(k) repeated eight times, which are multiplexed by the selector 520 using the "interleaving" function which depends on the permutation vector $P_n$. The interleaving function $I_0(k)$ is common for the first sixteen orthogonal preambles, and the interleaving function $I_1(k)$ is common for the remaining sixteen orthogonal preambles. Each preamble has a unique "signature" sequence, which depends on the weighting function $W_n$ and on the permutation vector $P_n$. The interleaving functions select one or the other output of EGC according to the structure of the transmitted preamble.

The first orthogonal set of 16 Golay sequences of length 4096, having the common constituent sequences A(k) and B(k) of length 256 (and a common interleaving function), are obtained by choosing a single permutation vector of length 4, along with 8 weighting vectors according to equation (2). All delays $D_n$ in equation (1) are multiplied by the length of constituent sequences ($T_{max}=256$).

The additional 16 orthogonal Golay sequences of length 4096 having the same constituent sequences A(k) and B(k), but interleaved by another selector 610 according to another interleaving function $I_1(k)$, are obtained by taking $$a_0(k)=B(k),$$

$$b_0(k)=A(k), k=0,1,2, \ldots, T_{max}-1,$$

The permutation vector and the weighting vectors used in equation (1) to obtain the additional set of orthogonal Golay sequences are the same as for the first set of orthogonal Golay sequences. In total, there are 32 orthogonal Golay sequences of length 4096 having the common constituent sequences of length 256. More generally, it is possible to generate $2 \cdot 2^J$ such orthogonal Golay sequences, where $2^J = L/T_{max}$.

These interleaving and signature functions are illustrated by an orthogonal set of Golay sequences of length 8 using the same example given in Tables 1 and 2 above. If $T_{max}=2$ and the constituent sequences are A(k)={1,1} and B(k)={1,−1}, the set of sequences given in Table 2 may be represented as shown in Table 3.

TABLE 3

| k | 0 | 1 | 2 | 3 | 4 | 5 | 6 | 7 |
|---|---|---|---|---|---|---|---|---|
| S(0,k) | A |   | A |   | B |   | −B |   |
| S(1,k) | A |   | −A |   | B |   | B |   |
| S(2,k) | A |   | A |   | −B |   | B |   |
| S(3,k) | A |   | −A |   | −B |   | −B |   |
| S(4,k) | B |   | B |   | A |   | −A |   |
| S(5,k) | B |   | −B |   | A |   | A |   |
| S(6,k) | B |   | B |   | −A |   | A |   |
| S(7,k) | B |   | −B |   | −A |   | −A |   |

The interleaving functions $I_0(k)$ and $I_1(k)$ are $$I_0(k)=\{0,0,1,1\} \text{ and } I_1(k)=\{1,1,0,0\},$$

where '0' value selects the cross-correlation with the sequence A(k) and a value of '1' selects the cross-correlation with the sequence B(k). Hence, the interleaving function $I_1(k)$ is the reverted version of $I_0(k)$. The first four 'signature' functions are given below:

Signature0={1, 1, 1, −1}, Signature1={1, −1, 1, 1},

Signature2={1, 1, −1, 1}, Signature3={1, −1, −1, −1}.

The values of the other four signature functions are the same, i.e., Signature4=Signature0, Signature5=Signature1, Siganture6=Signature2, and Signature7=Signature3.

The previous example application of the invention was to one or more correlators employed by the base station to receive and synchronize to random access bursts transmitted by mobile stations. Another example advantageous application of the invention mentioned earlier is to a cell search correlator used in the mobile station. During the initial cell search, the mobile station searches for the base station to which it has the lowest path loss. It then determines the time slot and frame synchronization of the base station, and the downlink scrambling code associated with the base station. The initial cell search is carried out in three steps: (1) Slot synchronization, (2) Frame synchronization and code-group identification, and (3) Scrambling-code identification. This other, non-limiting example application of the present invention is related to the first and second steps (1) and (2).

The slot synchronization procedure in the mobile station uses a primary synchronization code broadcast by all base stations at the beginning of each time slot and which is common to all base stations. The synchronization procedure consists of correlating the incoming signal with the primary synchronization code. The output of the correlator will generate peaks for each ray from each base station within range of the mobile station. Detecting the position of the strongest peak gives the timing of the strongest base station "modulo" the time slot length.

The slot synchronization is a critical step from the mobile station's point of view, because this operation is performed all the time, even if the mobile station already has a link to some other base station. Therefore, the implementation complexity of the mobile's correlator for the primary synchronization code should be minimized if possible. Such minimization may be achieved by exploiting a special structure of the primary synchronization code. On the other hand, the primary synchronization code should have minimum aperiodic autocorrelation sidelobes to minimize the probability of synchronizing the mobile station to a sidelobe rather than to the desired main lobe.

This latter requirement for the cell search primary synchronization code may be fulfilled by using the Golay complementary sequences, as it is proposed in commonly-assigned U.S. patent application Ser. No. 09/135,247 entitled "Communication Methods and Apparatus Based on Orthogonal Hadamard-Based Sequences Having Selected Autocorrelation Properties," filed on Aug. 17, 1998, the disclosure of which is incorporated by reference. That patent application does not specify an efficient method for the matched filtering of the primary synchronization code based on Golay complementary sequences for use in the first cell search step. Fortunately, the present invention provides an efficient implementation that uses Golay complementary sequences as primary synchronization codes.

Using an efficient Golay correlator similar to EGC 100 shown in FIG. 7 as the primary synchronization code correlator in the first step of the cell search provides a larger implementation gain than, for example, a hierarchical correlator (HC) similar to the correlator 400 shown in FIG. 11 matched to a hierarchical primary synchronization code. The hierarchical code of length 256 is obtained by serial, i.e., hierarchical concatenation of two constituent sequences of length 16, as included in one proposal for the UTRA system. In the preferred embodiment, the length of primary synchronization code is 256 chips. The Golay complementary sequences of length 256 are optimum for application as primary cell search codes because they have a minimum maximum absolute aperiodic autocorrelation sidelobe (MAS) value. The minimum MAS value obtained for all Golay complementary sequences of length 256 is 12. One pair of the Golay sequences which has a MAS=12 is defined by $$P_n=\{6,3,7,2,1,4,0,5\}, \text{ and } W_n=\{1,-1,-1,1,1,-1,1,1\}. \quad (3)$$

The number of memory bits $N_{mem}$ for the EGC may be calculated by taking into account the number of memory cells in each delay line and the fact that after the first delay line, the memory cell word length increases by 1 for each new delay line. Assuming a one-bit quantization of the received signal, it follows:

$$N_{mem}^{(EGC)}=1\cdot2^6+2\cdot2^3+3\cdot2^7+4\cdot2^2+5\cdot2^1+6\cdot2^4+7\cdot2^0+8\cdot2^5=849.$$

The hierarchical correlator (HC) requires one straightforward correlator of length 16 and 15 delay lines of length 16. The memory cell word length for each such delay line is 5 bits. Therefore, $N_{mem}^{(HC)}=1\cdot16+(5\cdot16)\cdot15=1216$ for the HC.

The Golay complementary sequence correlated by the EGC offer the following advantages over the hierarchical sequences:

- The number of adders is 16 for the EGC as compared to 30 adders for the HC.
- The number of multipliers is 8 for the EGC as compared to 32 for the HC.
- The number of memory bits is 30% less for the EGC than for the HC.
- The maximum absolute value of aperiodic autocorrelation sidelobes is 3 times lower for Golay complementary sequences than for hierarchical sequences.

Figure 14:
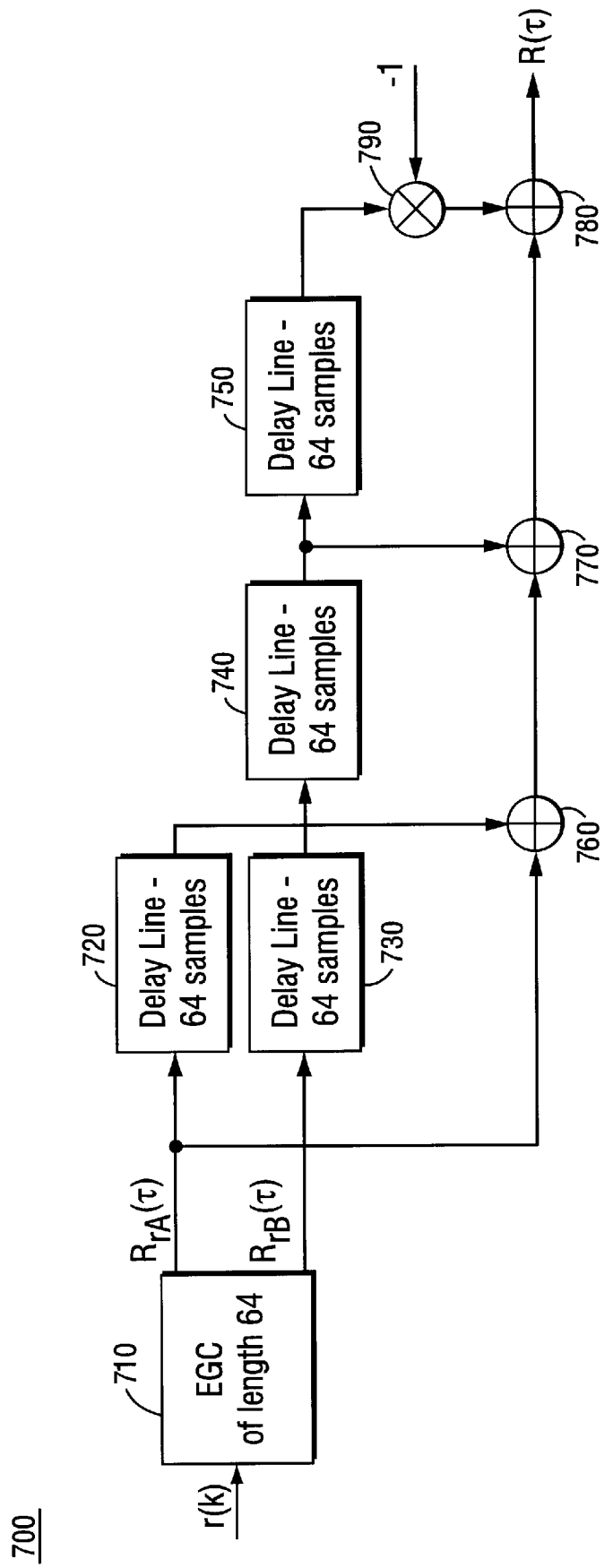
FIG. 14 is a block diagram of another example embodiment of the present invention implementing a factored, efficient, Golay correlator.

Another example embodiment of the invention provides a factored efficient Golay correlator; Such a correlator of length 256 is shown in FIG. 14. A Golay sequence represented in the factored form can be constructed as a concatenation of two shorter constituent (complementary) sequences, e.g., of length 64. In that case, the correlator 700 includes an efficient Golay correlator 710 of length 64, similar to that shown in FIG. 7, delay lines 720, 730, 740, and 750 of length 64, multipliers 790 and adders 760, 770, and 780. The total number of multipliers is at most 10, and the total number of adders is equal to 15. Note that the number of adders is 1 less than for the EGC of length 256. The actual number of delay lines depends on the interleaving sequence.

The correlator 700 may be useful when the coherence time of the receiver local oscillator is shorter than the sequence length, (e.g., it is at most 64 chips). As a result, a sub-optimum, non-coherent integration of the intermediate correlation values is necessary. In other words, a correlator 700 allows both coherent and non-coherent integration of intermediate correlation values. The example correlator 700 in FIG. 14 is coherent. In this example, the Golay sequence of length 256 is represented {-B, B, A, A}, where A and B are complementary sequences of length 64.

In a second step of the cell search, a set of 17 Secondary Synchronization Codes (SSCs) of length 256 chips may be used. The SSCs should be orthogonal to the primary synchronization code (PSC). Assuming that the primary synchronization code is a Golay complementary sequence in accordance with one example application of the invention, one way to generate the set of 17 orthogonal SSCs is proposed in commonly-assigned U.S. patent application Ser. No. 09/135,247 entitled "Communication Methods and Apparatus Based on Orthogonal Hadamard-Based Sequences Having Selected Autocorrelation Properties," filed on Aug. 17, 1998, the disclosure of which is incorporated by reference. The orthogonal set of SSCs is generated by multiplying the PSC by 17 different Walsh functions of the same length. Such a set of SSCs allows the use of a Fast Hadamard Transform (FHT) processor in the second step of cell search in order to reduce the implementation complexity. Moreover, if the PSC is a Golay complementary sequence, the set of sequences obtained by multiplying that Golay PSC by different Walsh functions results in an orthogonal set of Golay sequences. In this case, these SSCs may also be detected using a bank of EGCs similar to the primary synchronization code correlation procedure described above. Such a bank of EGC in accordance with the present invention is more efficient in terms of the number of required operations than correlation based on a FHT.

An additional requirement for SSCs is that the aperiodic cross-correlation between the PSC and each of 17 SSCs be small in order to minimize the interference from the secondary synchronization codes to the primary synchronization code correlator. In that case, it is advantageous to generate a complete set of 256 orthogonal Golay sequences of length 256 chips using equation (2), select one of these Golay sequences as the primary synchronization code, and then select 17 second synchronization codes that each have a maximum absolute aperiodic cross-correlation with the primary synchronization code which is less than some reasonable threshold. For example, assuming that the PSC is an a(k) sequence generated by equations (1) and (3), the set of 17 SSCs having a maximum absolute aperiodic cross-correlation with PSC less than or equal to a threshold of 42 is defined by the same permutation vector as in equation (3) and by the following weighting vectors:

$$
\begin{aligned}
W_{SSC1} &= \{\phantom{-}1 \phantom{-}\phantom{-}1 \phantom{-}\phantom{-}1 \phantom{-}-1 \phantom{-}\phantom{-}1 \phantom{-}\phantom{-}1 \phantom{-}-1 \phantom{-}1\}, &\text{(a)}\\
W_{SSC2} &= \{\phantom{-}1 \phantom{-}-1 \phantom{-}\phantom{-}1 \phantom{-}-1 \phantom{-}-1 \phantom{-}-1 \phantom{-}\phantom{-}1 \phantom{-}1\}, &\text{(b)}\\
W_{SSC3} &= \{-1 \phantom{-}\phantom{-}1 \phantom{-}\phantom{-}1 \phantom{-}-1 \phantom{-}-1 \phantom{-}\phantom{-}1 \phantom{-}\phantom{-}1 \phantom{-}1\}, &\text{(b)}\\
W_{SSC4} &= \{-1 \phantom{-}\phantom{-}1 \phantom{-}\phantom{-}1 \phantom{-}-1 \phantom{-}-1 \phantom{-}-1 \phantom{-}-1 \phantom{-}1\}, &\text{(a)}\\
W_{SSC5} &= \{-1 \phantom{-}\phantom{-}1 \phantom{-}-1 \phantom{-}\phantom{-}1 \phantom{-}-1 \phantom{-}\phantom{-}1 \phantom{-}\phantom{-}1 \phantom{-}1\}, &\text{(b)}\\
W_{SSC6} &= \{-1 \phantom{-}-1 \phantom{-}\phantom{-}1 \phantom{-}-1 \phantom{-}-1 \phantom{-}\phantom{-}1 \phantom{-}\phantom{-}1 \phantom{-}1\}, &\text{(b)}\\
W_{SSC7} &= \{-1 \phantom{-}-1 \phantom{-}\phantom{-}1 \phantom{-}-1 \phantom{-}-1 \phantom{-}-1 \phantom{-}-1 \phantom{-}1\}, &\text{(a)}\\
W_{SSC8} &= \{-1 \phantom{-}-1 \phantom{-}-1 \phantom{-}\phantom{-}1 \phantom{-}\phantom{-}1 \phantom{-}\phantom{-}1 \phantom{-}\phantom{-}1 \phantom{-}1\}, &\text{(b)}\\
W_{SSC9} &= \{-1 \phantom{-}-1 \phantom{-}-1 \phantom{-}\phantom{-}1 \phantom{-}\phantom{-}1 \phantom{-}\phantom{-}1 \phantom{-}-1 \phantom{-}1\}, &\text{(a)} \quad (4)\\
W_{SSC10} &= \{-1 \phantom{-}-1 \phantom{-}-1 \phantom{-}\phantom{-}1 \phantom{-}\phantom{-}1 \phantom{-}-1 \phantom{-}-1 \phantom{-}1\}, &\text{(a)}\\
W_{SSC11} &= \{-1 \phantom{-}-1 \phantom{-}-1 \phantom{-}\phantom{-}1 \phantom{-}-1 \phantom{-}-1 \phantom{-}\phantom{-}1 \phantom{-}1\}, &\text{(b)}\\
W_{SSC12} &= \{-1 \phantom{-}-1 \phantom{-}-1 \phantom{-}\phantom{-}1 \phantom{-}-1 \phantom{-}-1 \phantom{-}-1 \phantom{-}1\}, &\text{(a)}\\
W_{SSC13} &= \{-1 \phantom{-}-1 \phantom{-}-1 \phantom{-}\phantom{-}1 \phantom{-}-1 \phantom{-}-1 \phantom{-}-1 \phantom{-}1\}, &\text{(b)}\\
W_{SSC14} &= \{-1 \phantom{-}-1 \phantom{-}-1 \phantom{-}-1 \phantom{-}\phantom{-}1 \phantom{-}\phantom{-}1 \phantom{-}\phantom{-}1 \phantom{-}1\}, &\text{(a)}\\
W_{SSC15} &= \{-1 \phantom{-}-1 \phantom{-}-1 \phantom{-}-1 \phantom{-}\phantom{-}1 \phantom{-}\phantom{-}1 \phantom{-}-1 \phantom{-}1\}, &\text{(a)}\\
W_{SSC16} &= \{-1 \phantom{-}-1 \phantom{-}-1 \phantom{-}-1 \phantom{-}-1 \phantom{-}\phantom{-}1 \phantom{-}\phantom{-}1 \phantom{-}1\}, &\text{(a)}\\
W_{SSC17} &= \{-1 \phantom{-}-1 \phantom{-}-1 \phantom{-}-1 \phantom{-}-1 \phantom{-}\phantom{-}1, \phantom{-}-1 \phantom{-}1\}, &\text{(a)}
\end{aligned}
$$

The corresponding sequence SSCn is equal to the Golay sequence a(k) or b(k) (indicated in the brackets attached to each vector in (4)) when the weighting vector $W_{SSCn}$ is replaced in (1). The SSCs can be detected by using the corresponding bank of 17 (or less) EGCs, similarly as for PSC.

Figure 15:
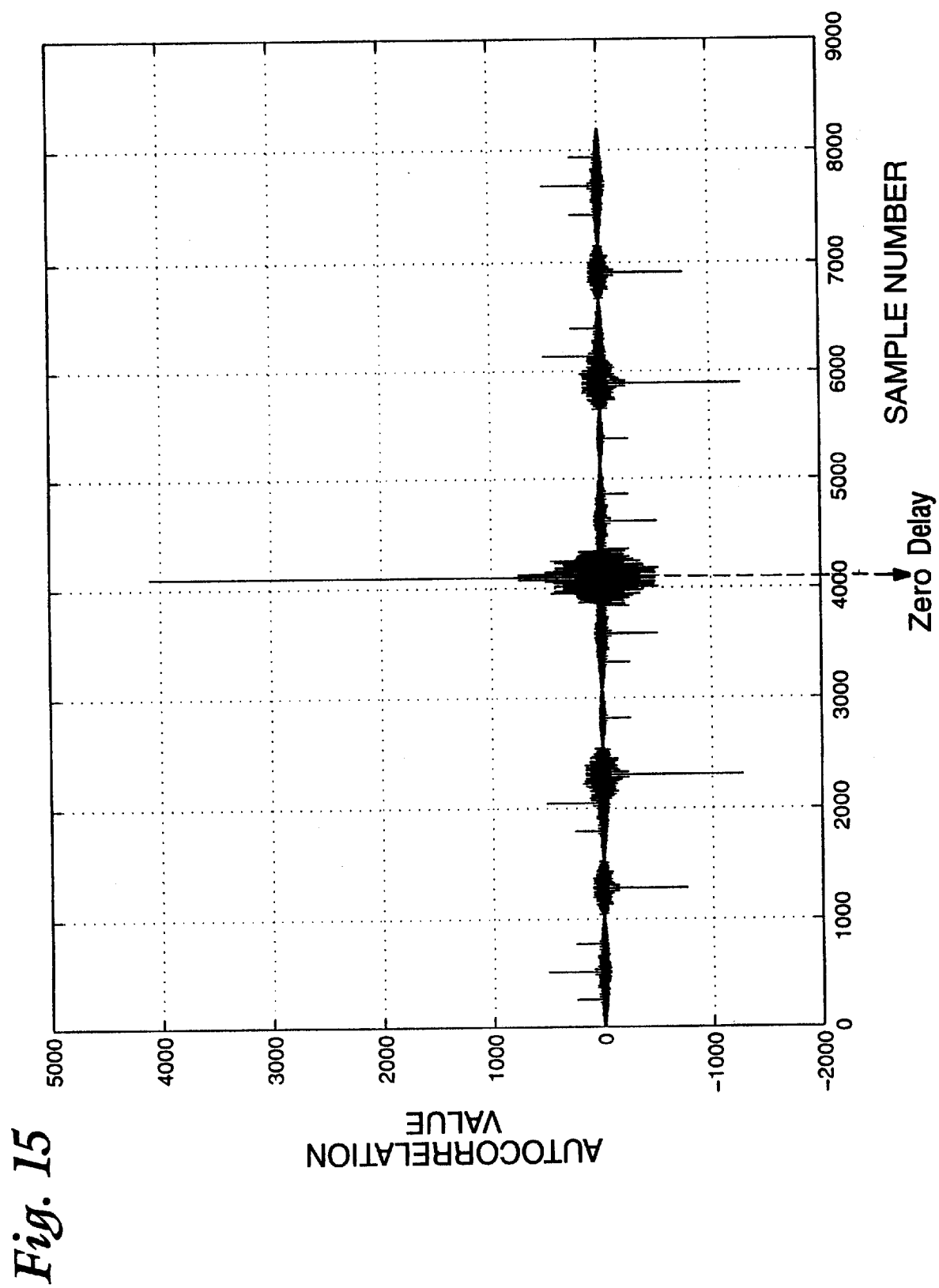
FIG. 15 is a graph illustrating autocorrelation value against delay for a random access preamble correlator.
Figure 16:
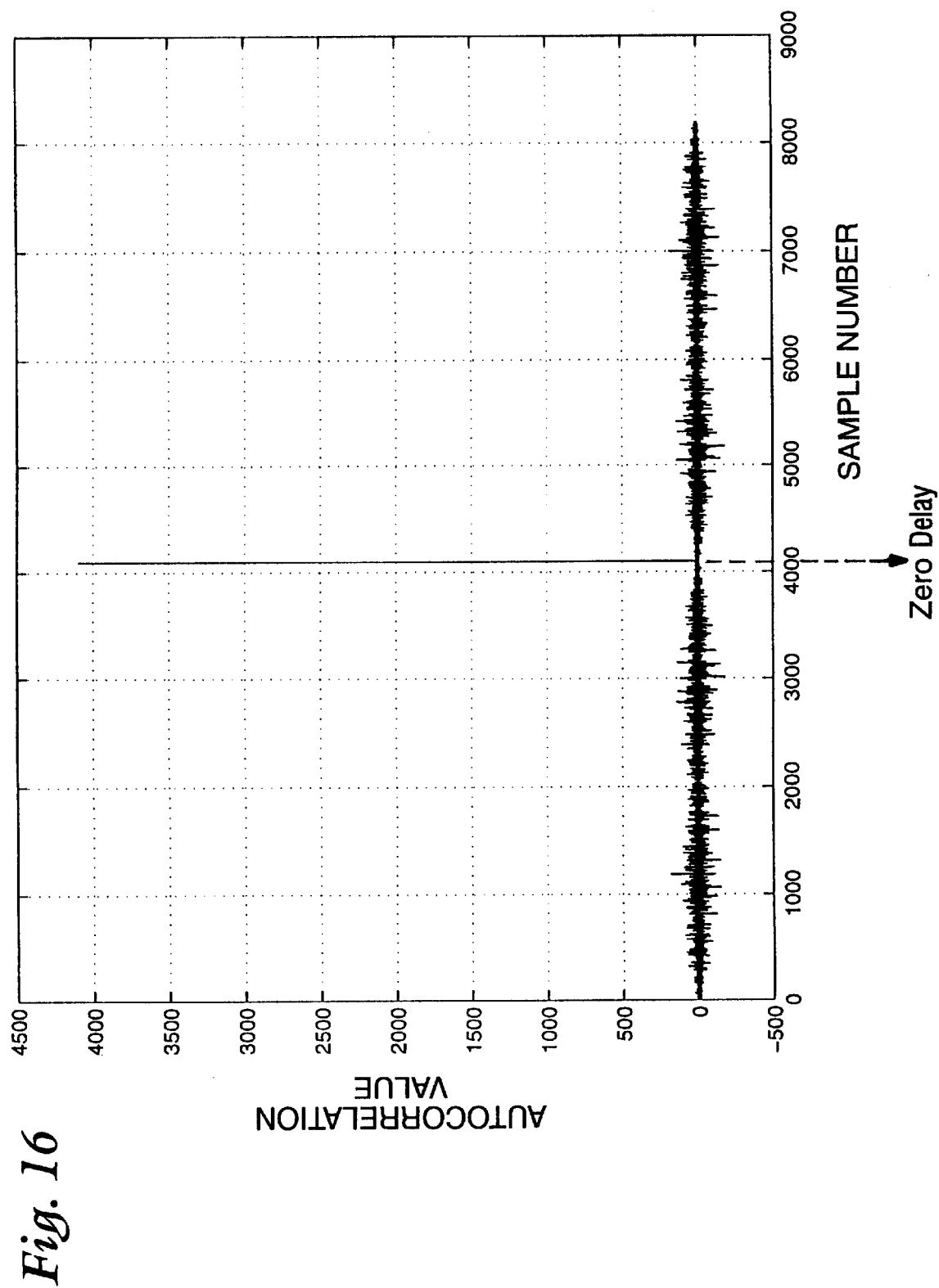
FIG. 16 is a graph illustrating autocorrelation value against delay for a random access preamble correlator implementing the example embodiment of the present invention.

Besides the improved implementation efficiency, synchronization codes based on Golay complementary pair sequences offer superior performance in terms of the maximum absolute aperiodic autocorrelation sidelobes (MAS) as compared for example to the synchronization sequences based on concatenated Orthogonal Gold sequences. This comparison is illustrated by the graphs in FIGS. 15 and 16. FIG. 15 is a graph of the aperiodic autocorrelation function of serially concatenated orthogonal Gold sequences. Note that although there is a substantial maximum at the sample corresponding to zero delay, there are also significant maximum peaks which could cause false correlation detections at various non-zero delays. In contrast, the graph in FIG. 16 shows that for synchronization codes based on Golay complementary pair sequences, the sidelobes are much lower, and in the range of interest for the random access detection, (i.e., +/−255 chips around the main lobe), the sidelobes are even lower than elsewhere.

For the application of orthogonal Golay complementary sequences as the random access preambles, it is of interest to compare their aperiodic autocorrelation properties with those of another set of orthogonal preambles obtained by serial concatenation of orthogonal signatures with a common preamble spreading code. The parameter for comparison is the maximum absolute aperiodic autocorrelation sidelobe (MAS) of each preamble in the set. In this example comparison which is directed to the currently evolving UTRA system, a set of 16 orthogonal Golay sequences of length 4096 in accordance with the present invention is compared with another UTRA proposal for the RACH preambles based on orthogonal Gold sequences. Table 4 provides sixteen Golay sequences as a function of two shorter, constituent complementary sequences A(k) and B(k) of length 256.

orthogonal Gold sequences obtained from 16 orthogonal signatures spread by a common preamble spreading code as described in another proposal for UTRA (the preamble spreading code number n=1), are shown in Table 5.

TABLE 5

| Golay sequences | | Concatenated Orthogonal Gold sequences | |
|---|---|---|---|
| Number of occurrences | MAS | Number of occurrences | MAS |
| 4 | 161 | 1 | 1024 |
| 4 | 181 | 4 | 1280 |
| 8 | 183 | 7 | 1536 |
| — | — | 2 | 1792 |
| — | — | 2 | 2048 |

As described earlier, the random access preambles are not completely asynchronous to the base station receiver because the mobile terminal already has the basic information about base station timing, but there is an uncertainty introduced by the round-trip propagation delay between the base station and the mobile terminal. One reasonable assumption is that the round-trip delay is at most 255 chips, so the aperiodic autocorrelation function of random access preambles is actually of interest only in the region +/−255 chips around the main lobe. The maximum absolute values of aperiodic autocorrelation sidelobes in the region +/−255 chips around the main lobe are shown in Table 6 for the previously described orthogonal Golay and concatenated orthogonal Gold sequences of length 4096.

TABLE 4

| K | 0 ... 255 ... | | | | | | | | | | | | | | | ... 4095 |
|---|---|---|---|---|---|---|---|---|---|---|---|---|---|---|---|---|
| S(0,k) | A | A | B | B | A | −A | −B | B | A | −A | B | −B | A | A | −B | −B |
| S(1,k) | A | A | B | B | A | −A | −B | B | −A | A | −B | B | −A | −A | B | B |
| S(2,k) | A | −A | B | −B | A | A | −B | −B | A | A | B | B | A | −A | −B | B |
| S(3,k) | A | −A | B | −B | A | A | −B | −B | −A | −A | −B | −B | −A | A | B | −B |
| S(4,k) | A | A | B | B | −A | A | B | −B | A | −A | B | −B | −A | −A | B | B |
| S(5,k) | A | A | B | B | −A | A | B | −B | −A | A | −B | B | A | A | −B | −B |
| S(6,k) | A | −A | B | −B | −A | −A | B | B | A | A | B | B | −A | A | B | −B |
| S(7,k) | A | −A | B | −B | −A | −A | B | B | −A | −A | −B | −B | A | −A | −B | B |
| S(8,k) | A | A | −B | −B | A | −A | B | −B | A | −A | −B | B | A | A | B | B |
| S(9,k) | A | A | −B | −B | A | −A | B | −B | −A | A | B | −B | −A | −A | −B | −B |
| S(10,k) | A | −A | −B | B | A | A | B | B | A | A | −B | −B | A | −A | B | −B |
| S(11,k) | A | −A | −B | B | A | A | B | B | −A | −A | B | B | −A | A | −B | B |
| S(12,k) | A | A | −B | −B | −A | A | −B | B | A | −A | −B | B | −A | −A | −B | −B |
| S(13,k) | A | A | −B | −B | −A | A | −B | B | −A | A | B | −B | A | A | B | B |
| S(14,k) | A | −A | −B | B | −A | −A | −B | −B | A | A | −B | −B | −A | A | −B | B |
| S(15,k) | A | −A | −B | B | −A | −A | −B | −B | −A | −A | B | B | A | −A | B | −B |

The constituent Golay sequences A(k) and B(k) are obtained from equation (1) using the permutation $$P_n = \{0,2,1,5,6,4,7,3\},$$

and weighting $$W_n\{1,-1,1,-1,1,-1,-1,1\}.$$

The MAS values for the set of 16 orthogonal Golay sequences defined above, and for the set of 16 concatenated

TABLE 6

| Golay sequences | | Concatenated Orthogonal Gold sequences | |
|---|---|---|---|
| Number of occurrences | MAS | Number of occurrences | MAS |
| 16 | 31 | 1 | 731 |
| — | — | 2 | 737 |
| — | — | 3 | 743 |
| — | — | 3 | 755 |
| — | — | 6 | 761 |
| — | — | 1 | 767 |

Table 6 shows that the orthogonal Golay sequences have about 25 times lower autocorrelation sidelobes than the concatenated orthogonal Gold sequences, in the region +/−255 chips around the main lobe.

While the present invention has been described with respect to a particular embodiment, those skilled in the art will recognize that the present invention is not limited to the specific embodiments described and illustrated herein. Different formats, embodiments, and adaptations besides those shown and described as well as many modifications, variations, and equivalent arrangements may also be used to implement the invention. Therefore, while the present invention has been described in relation to its preferred embodiments, it is to be understood that this disclosure is only illustrative, in no way restrictive, and merely exemplary of the present invention.

What is claimed:

1. A method for correlating at a first transceiver a received signal transmitted by a second transceiver, comprising:

using a matched filter corresponding to a complementary pair of sequences to correlate the received signal with one of the complementary pair of sequences, where the complementary pair of sequences has a property that the sum of their aperiodic autocorrelations equals zero for all non-zero shifts;

detecting a peak output from the matched filter, using the detected peak output to generate a timing estimate for synchronizing transmissions between the first and second transceivers; and using complex correlation values corresponding to detected peak outputs as fading channel coefficients in demodulating a message included in the received signal.

2. The method in claim 1, wherein the matched filter correlates the received signal with both complementary sequences at the same time.

3. The method in clam 1, wherein the matched filter correlates the received signal with the complementary sequences recursively.

4. The method in claim 1, wherein the first transceiver is a base station and the second transceiver is a mobile station, and wherein the one sequence is used as a preamble portion of a random access message transmitted by the mobile station to the base station over a random access channel.

5. The method in claim 4, wherein the complementary sequences are Golay sequences of a length 2 or longer.

6. The method in claim 5, wherein each of the Golay sequences is generated by concatenating a pair of shorter Golay sequences.

7. The method in claim 1, wherein the first transceiver is a mobile station and the second transceiver is a base station, and wherein the one sequence is used as a synchronization sequence transmitted by the base station over a broadcast channel.

8. The method in claim 1, further comprising:

employing a plurality of the matched filters, each corresponding to an orthogonal, complementary pair of sequences, wherein the peak output is detected from one of the matched filters.

9. A method for correlating at a first transceiver a received signal transmitted by a second transceiver, comprising:

using a matched filter corresponding to a complementary pair of sequences to correlate the received signal with one of the complementary pair of sequences;

detecting a peak output from the matched filter, and using the detected peak output to generate a timing estimate for synchronizing transmissions between the first and second transceivers, wherein the complementary pair of sequences is a complementary pair of sequences determined in accordance with the following:

$a_0(k)=\delta(k)$ $b_0(k)=\delta(k)$ $a_n(k)=a_{n-1}(k)+W_n \cdot b_{n-1}(k-D_n)$ $b_n(k)=a_{n-1}(k)-W_n \cdot b_{n-1}(k-D_n)$, where $k=0,1,2,\ldots,2^N-1$; $n=1,2,\ldots,N$; $D_n=2^{P_n}$; $a_n(k)$ and $b_n(k)$ are the complementary pair of sequences of length $2^N$; $\delta(k)$ is the Kronecker delta function; k is an integer representing the time scale; n is the iteration number, $D_n$ is a delay, $P_n$, $n=1,2,\ldots,N$, is any permutation of numbers $\{0,1,2,\ldots,N-1\}$; and $W_n$ is an arbitrary complex number of unit magnitude.

10. A method for generating a synchronization sequence at a first transceiver for transmission to a second transceiver, comprising:

generating a sequence from a pair of sequences having minimal aperiodic autocorrelation values for all non-zero delays of that sequence and a maximal autocorrelation value for a zero delay of that binary sequence; and transmitting a signal from the first transceiver using the sequence to permit a second transceiver to synchronize with the first transceiver, wherein the sequence is obtained from a pair of sequences of length $L=2^N$, where N is a positive integer, and wherein the pair of sequences is determined in accordance with the following:

$a_0(k)=\delta(k)$ $b_0(k)=\delta(k)$ $a_n(k)=a_{n-1}(k)+W_n \cdot b_{n-1}(k-D_n)$ $b_n(k)=a_{n-1}(k)-W_n \cdot b_{n-1}(k-D_n)$, where $k=0,1,2,\ldots,2^N-1$; $n=1,2,\ldots,N$; $D_n=2^{P_n}$; $a_n(k)$ and $b_n(k)$ are the pair of sequences of length $2^N$; $\delta(k)$ is the Kronecker delta function; k is an integer representing the time scale; n is the iteration number, $D_n$ is a delay, $P_n$, $n=1,2,\ldots,N$, is any permutation of numbers $\{0,1,2,\ldots,N-1\}$; and $W_n$ is +1 or −1.

11. The method in claim 10, wherein the first transceiver is contained in a mobile radio and the second transceiver is contained in a base station, and the mobile station transmits the sequence over a random access channel associated with the base station.

12. The method in claim 11, wherein the sequence is known by both the base station and the mobile station.

13. The method in claim 12, wherein the base station performs a correlation process upon signals received from the mobile station using the sequence to detect a time in the correlation process when the a maximal autocorrelation value is obtained.

14. The method in claim 11, wherein the sequence is used in a preamble of random access burst transmitted by the mobile station over the random access channel.

15. The method in claim 10, further comprising:

generating a set of sequences of length L, each sequence having a minimal aperiodic autocorrelation value for all non-zero delays of that sequence and a maximal autocorrelation value for a zero delay of that sequence,
wherein the first transceiver transmits one of the sequences in the set to permit the second transceiver to synchronize with the first transceiver.

16. The method in claim 15, wherein the sequences in the set are orthogonal.

17. The method in claim 10, wherein the first transceiver is contained in a base station and the second transceiver is contained in a mobile radio, and wherein the base station broadcasts the sequence on a broadcast channel to permit the mobile transceiver to synchronize at least roughly with the base station.

18. The method in claim 10, wherein the length is 4096.

19. The method in claim 10, where $a_0(k)=A(k)$ and $b_0(k)=B(k)$ form a pair of binary sequences of length T and the delay $D_n=T*2^{P_n}$.

20. The method in claim 10, where a set of $2^N$ orthogonal sequences is obtained from a common permutation vector $P_n$ and a set of $2^{N-1}$ weighting vectors $W_n$, wherein the set of weighting vectors is an N-bit long binary representation of different, even positive integers or different, odd, positive integers taken from a set of integers $\{0,1, \ldots, 2^{N-1}\}$, and wherein a zero in the binary representation is mapped to one of $\{-1, +1\}$ and a one in the binary representation is mapped to the other of $\{-1,+1\}$.

21. The method in claim 20, where $a_0(k)=A(k)$ and $b_0(k)=B(k)$ form a pair of binary sequences of length T and the delay $D_n=T*2^{P_n}$.

22. The method in claim 19, further comprising:
directly generating the pair of sequences using a sequence generator that requires only N memory elements.

23. The method in claim 19, further comprising:
directly generating the pair of sequences using a sequence generator that includes a modulo $2^N$ counter.

24. The method in claim 19, wherein $A(k)=B(k)$.

25. A method for synchronizing a first transceiver to a second transceiver, comprising:
correlating a received signal with one of a pair of sequences using an efficient correlation procedure providing a minimal number of mathematical operations, where the pair of sequences has a property that the sum of their aperiodic autocorrelations equals zero for all non-zero time shifts;
detecting at what point in time during the correlating a maximal autocorrelation value is obtained; and
synchronizing a next transmission to the second transceiver based on the detected time,
wherein the pair of sequences are determined in accordance with the following:

$a_0(k)=\delta(k)$
$b_0(k)=\delta(k)$
$a_n(k)=a_{n-1}(k)+W_n \cdot b_{n-1}(k-D_n)$
$b_n(k)=a_{n-1}(k)-W_n \cdot b_{n-1}(k-D_n)$, where $k=0,1,2, \ldots, 2^N-1$; $n=1,2, \ldots, N$; $D_n=2^{P_n}$; $a_n(k)$ and $b_n(k)$ are the pair of sequences of length $2^N$; $\delta(k)$ is the Kronecker delta function; k is an integer representing the time scale; n is the iteration number, $D_n$ is a delay, $P_n$, $n=1,2, \ldots, N$, is any permutation of numbers $\{0,1,2, \ldots, N-1\}$; and $W_n$ is an arbitrary complex number of unit magnitude.

26. The method in claim 25, wherein the correlating step is performed efficiently to reduce a number of data processing steps required to perform the correlating.

27. The method in claim 25, wherein the correlating step is performed efficiently to reduce an amount of memory required to perform the correlating.

28. The method in claim 25, wherein the correlating step includes correlating the pair of sequences simultaneously with the input signal.

29. The method in claim 25, wherein the pair of sequences are Golay sequences, and wherein the one of the Golay sequences is used as a primary synchronization sequence.

30. In a direct sequence, spread spectrum radio transceiver, a sequence correlator efficiently correlating a received spread spectrum signal with a pair of complementary sequences of length $L=2^N$ with N being any positive integer, comprising:
N serially concatenated processing stages, each stage having first and second parallel processing branches;
each stage of the first processing branch including a delay line having plural memory elements coupled to a corresponding adder;
wherein in each processing stage, samples of an input signal are successively stored in memory elements of the corresponding delay line, the content of a last memory element being input to the adder and to the subtractor of the same processing stage; and
wherein the input signal is multiplied in the multiplier in the same stage by a corresponding weighting coefficient, and the output of the multiplier is fed as an input to the subtractor and to the adder in the same stage.

31. The correlator in claim 30, wherein the output of the first processing branch at the N-th processing stage produces a cross-correlation of the received spread spectrum signal with a first sequence from a pair of sequences, and the output of the second processing branch at the N-th processing stage produces a cross-correlation of the received spread spectrum signal with a second sequence from a pair of sequences.

32. The correlator in claim 31, wherein the sequences are determined in accordance with the following:

$a_0(k)=\delta(k)$
$b_0(k)=\delta(k)$
$a_n(k)=a_{n-1}(k)+W_n \cdot b_{n-1}(k-D_n)$
$b_n(k)=a_{n-1}(k)-W_n \cdot b_{n-1}(k-D_n)$, where $k=0,1,2, \ldots, 2^N-1$; $n=1,2, \ldots, N$; $D_n=2^{P_n}$; $a_n(k)$ and $b_n(k)$ are the pair of sequences of length $2^N$; $\delta(k)$ is the Kronecker delta function; k is an integer representing the time scale; n is the iteration number, $D_n$ is a delay, $P_n$, $n=1,2, \ldots, N$, is any permutation of numbers $\{0,1,2, \ldots, N-1\}$; and $W_n$ is an arbitrary complex number of unit magnitude.

33. The correlator in claim 31, wherein the weighting coefficient is a complex conjugate of $W_n$.

34. A correlator correlating at a first transceiver a received spread spectrum signal transmitted by at a second transceiver using one of the sequences from a pair of sequences of length $L=2^N$, where N is any positive integer, and where the one sequence is represented as a concatenation of two shorter, constituent sequences of length X, each constituent sequence having been repeated L/X times and modulated by +1 or −1 according to a signature sequence of length $Y=L/X$, comprising:
a first correlator of a length X receiving the spread spectrum signal and generating an intermediate pair of correlation values corresponding to the constituent sequences;

a first selector alternately supplying one of the intermediate pair of correlation values during each of successive time windows based on a current value of an interleaving sequence of length Y=L/X whose elements belong to the set {0,1}, where an order of concatenation of the constituent sequences is determined by the interleaving sequence;

a multiplier multiplying the selected intermediate correlation values with an element of the signature sequence to generate a multiplied correlation output; and a summer summing the multiplied correlation output with a feedback output of a delay line having X memory elements and providing the resulting sum as an input to the delay line, wherein a final correlation value corresponds to the resulting sum after Y successive time windows.

35. The correlator in claim 34, wherein n=12, L=4096, X=256, and Y=16.

36. The correlator in claim 34, wherein the first correlator is a correlator as defined in claim 30.

37. The correlator in claim 34, wherein the correlator correlates the received spread spectrum signal with plural orthogonal sequences generated using plural signatures, further comprising:

a plurality of multipliers each multiplying the selected intermediate correlation values with an element of a different signature sequence to generate a corresponding multiplied correlation output;

a plurality of summers, each summer corresponding to one of the multipliers and summing the multiplied correlation output with a feedback output of a corresponding delay line having X memory elements and providing the resulting sum as an input to the delay line, wherein a final correlation value for each of the orthogonal sequences from each of the summers corresponds to each summer's resulting sum after Y successive time windows.

38. The correlator in claim 34, wherein there are 16 signatures, 16 multipliers, 16 summers, and 16 delay lines producing 16 correlation values corresponding to 16 orthogonal sequences.

39. The correlator in claim 38, wherein there are 32 signatures, 32 multipliers, 32 summers, and 32 delay lines producing 32 correlation values corresponding to 32 orthogonal sequences.

40. The correlator in claim 39, wherein the first selector output is coupled to 16 of the 32 multipliers along with 16 of the signatures, further comprising:

a second selector alternately supplying the other of the intermediate pair of correlation values during each of the successive time windows based on a current value of a second interleaving sequence of length Y=L/X whose elements belong to the set {0,1}, where an order of concatenation of the constituent sequences is determined by the interleaving sequence, wherein the second selector output is coupled to the remaining 16 of the 32 multipliers along with the remaining 16 signatures.

41. The correlator in claim 34, wherein the pair of sequences is a Golay pair and the first correlator is an efficient Golay correlator using a reduced amount of required memory or data processing operations.

42. A method for correlating at a first transceiver a received spread spectrum signal transmitted by at a second transceiver using one of the sequences from a pair of Golay complementary sequences of length $L=2^N$, where N is any positive integer, comprising:

representing the one Golay sequence as a concatenation of two shorter, constituent complementary sequences A(k) and B(k) of length X, each constituent sequence having been repeated L/X times and modulated by +1 or −1 according to a signature sequence of length Y=L/X, where an order of concatenation is determined by an interleaving sequence of length Y=L/X, whose elements are 0 or 1, comprising:

using a Golay correlator of a length X receiving the spread spectrum signal to generate an intermediate pair of correlation values corresponding to the constituent Golay complementary sequences;

storing the intermediate correlation values at a first correlation output of the Golay correlator in a first group of Y=(L/X)−1 or less serially concatenated delay lines, where each delay line has X memory elements;

storing the intermediate correlation values at a second correlation output of the Golay correlator in a second group of Y=(L/X) −1 or less serially concatenated delay lines, where each delay line has X memory elements;

multiplying the first correlator output and the outputs of the first group of delay lines by respective elements of a reverted version of the signature sequence;

summing only those multiplied intermediate correlation values from the first correlation output and attached delay lines which correspond to non-zero elements of a reverted version of the interleaving sequence, and only those multiplied intermediate correlation values from the second correlation output and attached delay lines which correspond to non-zero elements of the inverted and reverted version of the interleaving sequence, where the first element of the reverted version of the interleaving sequence corresponds to the correlator output and the last element of such sequence corresponds to the output of the last delay line in the cascade; and outputting a result of the summing step as a final correlation value.

43. The method in claim 42, wherein the Golay correlator corresponds to the correlator defined in claim 30.

44. The method in claim 42, wherein the received spread spectrum signal is non-coherently correlated using one of the sequences from a pair of Golay complementary sequences.

45. The method in claim 42, wherein the received spread spectrum signal is coherently correlated using one of the sequences from a pair of Golay complementary sequences, further comprising:

multiplying the second correlator output and the outputs of the second group of delay lines by respective elements of a reverted version of the signature sequence.

46. A correlator for use in a base station to correlate a received signal transmitted by a mobile station, comprising:

a matched filter corresponding to a complementary pair of sequences to correlate the received signal with one of the complementary pair of sequences, where each of the complementary sequences has minimal aperiodic autocorrelation sidelobe values for all non-zero delays of that complementary sequence and a maximal autocorrelation main lobe value for a zero delay of that complementary sequence;

a detector detecting a peak output from the matched filter; and timing circuitry using the detected peak output to generate a timing estimate for synchronizing transmissions between the base station and mobile station;

wherein the complementary sequences include a primary synchronization sequence and plural secondary synchronization sequences transmitted by the base station and used by the mobile station to attain primary and secondary synchronization with the base station.

47. The correlator in claim 46, wherein the one sequence is used as a preamble portion of a random access message transmitted by the mobile station to the base station over a random access channel.

48. The correlator in claim 46, wherein the one sequence is used as a synchronization sequence transmitted by the base station over a broadcast channel.

49. The correlator in claim 46, wherein the complementary sequences are Golay sequences of a length 2 or longer.

50. The correlator in claim 46, wherein the complementary pair of sequences is a Golay pair and the matched filter is an efficient Golay correlator using a reduced amount of memory or a reduced amount of data processing operations.

51. A bank of correlators for use in a mobile transceiver to correlate received signals transmitted by a base station with a plurality of Golay complementary sequences, each correlator comprising:

a matched filter corresponding to a Golay complementary pair of sequences to correlate the received signal with one of the Golay complementary pair of sequences;

a detector detecting a peak output from the matched filter; and timing circuitry using the detected peak output to generate a timing estimate for synchronizing transmissions between the mobile transceiver and the base station.

52. The bank of correlators in claim 51, wherein each of the Golay complementary sequences has minimal aperiodic autocorrelation sidelobe values for non-zero delays of that Golay complementary sequence and a maximal autocorrelation main lobe value for a zero delay of that Golay complementary sequence.

53. The bank of correlators in claim 51, wherein the Golay complementary sequences include a primary synchronization sequence and plural secondary synchronization sequences transmitted by the base station and used by the mobile station to attain primary and secondary synchronization with the base station.

54. The bank of correlators in claim 53, wherein the matched filter in each correlator is an efficient Golay correlator using a reduced amount of memory or a reduced amount of data processing operations.

55. The bank of correlators in claim 53, wherein each correlator corresponds to the correlator in claim 30.

56. A method for use in synchronizing mobile stations with a base station using a primary synchronization code and plural secondary synchronization codes transmitted by the base station, comprising:

providing one of a set of Golay complementary sequences as the primary synchronization code;

providing plural other ones of the set of Golay complementary sequences with minimal cross-correlation with the primary synchronization code as the secondary synchronization codes; and obtaining a primary synchronization and a secondary synchronization with the base station using the provided primary and secondary synchronization codes.

57. The method in claim 56, wherein the primary synchronization code and 17 secondary synchronization codes are selected from a set of 256 orthogonal Golay sequences.

58. The method in claim 56, wherein the minimal cross-correlation is determined using a threshold.

59. The method in claim 58, wherein the minimal cross-correlation is minimal aperiodic cross-correlation.

60. The method in claim 56, further comprising:

using a bank of efficient Golay correlators to correlate a signal received by the mobile station with the primary and secondary synchronization codes.

* * * * *